United States Patent
Shibata et al.

(10) Patent No.: US 8,396,019 B2
(45) Date of Patent: Mar. 12, 2013

(54) NETWORK SYSTEM, NETWORK APPARATUS AND TRANSFER APPARATUS

(75) Inventors: Takeshi Shibata, Yokohama (JP); Seishi Hanaoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 907 days.

(21) Appl. No.: 12/068,831

(22) Filed: Feb. 12, 2008

(65) Prior Publication Data
US 2009/0046615 A1 Feb. 19, 2009

(30) Foreign Application Priority Data
Aug. 17, 2007 (JP) ................................ 2007-212834

(51) Int. Cl.
*H04H 20/71* (2008.01)
(52) U.S. Cl. ......... 370/312; 370/390; 370/392; 370/389
(58) Field of Classification Search ........................ None
See application file for complete search history.

(56) References Cited

U.S. PATENT DOCUMENTS

| | | | |
|---|---|---|---|
| 6,208,647 B1 * | 3/2001 | Deng et al. ................. | 370/390 |
| 7,106,735 B2 * | 9/2006 | Yagyu et al. ............... | 370/390 |
| 7,558,273 B1 * | 7/2009 | Grosser et al. ........... | 370/395.53 |
| 7,733,859 B2 * | 6/2010 | Takahashi et al. ........... | 370/389 |
| 7,961,614 B2 * | 6/2011 | Kyusojin et al. ............ | 370/232 |
| 7,965,709 B2 * | 6/2011 | Du ............................. | 370/389 |
| 7,996,894 B1 * | 8/2011 | Chen et al. .................. | 726/22 |
| 8,166,205 B2 * | 4/2012 | Farinacci et al. ............ | 709/249 |
| 2003/0202513 A1 * | 10/2003 | Chen et al. .................. | 370/390 |
| 2004/0158872 A1 | 8/2004 | Kobayashi | |
| 2005/0002395 A1 * | 1/2005 | Kondo ......................... | 370/390 |
| 2005/0076145 A1 * | 4/2005 | Ben-Zvi et al. ............... | 709/245 |
| 2005/0100016 A1 * | 5/2005 | Miller et al. .................. | 370/390 |
| 2005/0180440 A1 | 8/2005 | Perrot et al. | |
| 2006/0184663 A1 * | 8/2006 | Takahashi et al. ........... | 709/224 |

(Continued)

FOREIGN PATENT DOCUMENTS

| | | | |
|---|---|---|---|
| EP | 1732272 A1 * | 12/2006 | |
| JP | 2004-153312 | 10/2002 | |

(Continued)

OTHER PUBLICATIONS

"Part 11: Wireless LAN Medium Access Control (MAC) and Physical Layer (PHY) Specifications", Information Technology—Telecommunications and Information Exchange Between Systems—Local and Metropolitan Area Networks—Specific Requirements, ANSI/IEEE Std. 802.11, 1999 Edition, pp. ii-xiv and 1-512.

(Continued)

*Primary Examiner* — Ian N Moore
*Assistant Examiner* — Dung B Huynh
(74) *Attorney, Agent, or Firm* — Crowell & Moring LLP

(57) ABSTRACT

In order to maintain the reliability of telecommunication by means of the multicast wireless communication when IP multicast is used in the IP broadcast service, the network system includes a transfer apparatus for transferring multicast packets and transfer request packets and a network apparatus for receiving transfer request packets and for transferring the multicast packets to be distributed. The transfer apparatus transmits transfer requests together with transfer request packets when it transmits multicast packets to the receiver requiring unicast communication, and the network apparatus receives multicast packets, sets the destination MAC address of the multicast packet as the unicast MAC address of the receiver in response to the conversion request from the transfer apparatus and transfers multicast packets.

11 Claims, 27 Drawing Sheets

U.S. PATENT DOCUMENTS

| | | | |
|---|---|---|---|
| 2007/0115973 A1* | 5/2007 | Koga et al. | 370/389 |
| 2007/0242682 A1* | 10/2007 | Kyusojin et al. | 370/401 |
| 2008/0031248 A1* | 2/2008 | Vilei et al. | 370/390 |
| 2008/0089263 A1* | 4/2008 | Tsutsumi | 370/312 |
| 2008/0186896 A1* | 8/2008 | Fanfelle et al. | 370/312 |
| 2008/0225769 A1* | 9/2008 | Noisette et al. | 370/312 |
| 2008/0232373 A1* | 9/2008 | Iyer et al. | 370/392 |
| 2008/0291826 A1* | 11/2008 | Licardie et al. | 370/230 |
| 2009/0141718 A1* | 6/2009 | Higashida et al. | 370/390 |
| 2009/0147718 A1* | 6/2009 | Liu et al. | 370/312 |
| 2009/0190588 A1* | 7/2009 | Eder et al. | 370/392 |
| 2009/0245251 A1* | 10/2009 | Koide | 370/390 |

FOREIGN PATENT DOCUMENTS

| | | |
|---|---|---|
| JP | 2004-242063 | 2/2003 |
| JP | 2005-236991 | 2/2005 |
| JP | 2006-333309 | 5/2005 |
| JP | 2007-049382 | 8/2005 |

OTHER PUBLICATIONS

Office Action from the Japanese Patent Office, dated Jul. 7, 2009, in Japanese.

* cited by examiner

FIG. 5

| IP MULTICAST GROUP ADDRESS (2101) | INPUT INTERFACE (2102) | OUTPUT INTERFACE (2103) | |
|---|---|---|---|
| 239.255.1.1 | #1 | #11 | 2111 |
| 239.255.1.1 | #1 | #12 | 2112 |
| 239.255.1.2 | #2 | #13 | 2113 |
|  |  |  |  |
|  |  |  |  |

FIG. 6

| IP MULTICAST GROUP ADDRESS (2201) | OUTPUT INTERFACE (2202) | DESTINATION MAC ADDRESS (2203) | |
|---|---|---|---|
| 239.255.1.1 | #11 | 01:00:5e:7f:01:01 | 2211 |
| 239.255.1.1 | #11 | 00:01:02:03:04:05 | 2212 |
| 239.255.1.1 | #12 | 00:11:12:13:14:15 | 2213 |
| 239.255.1.2 | #13 | 00:11:22:33:44:55 | 2214 |
| 239.255.1.2 | #13 | 00:12:23:34:45:56 | 2215 |

FIG. 7

| IP MULTICAST GROUP ADDRESS | INPUT INTERFACE | OUTPUT INTERFACE | DESTINATION MAC ADDRESS |
|---|---|---|---|
| 239.255.1.1 | #1 | #11 | 01:00:5e:7f:01:01 |
| 239.255.1.1 | #1 | #11 | 00:01:02:03:04:05 |
| 239.255.1.1 | #1 | #12 | 00:11:12:13:14:15 |
| 239.255.1.2 | #2 | #13 | 00:11:22:33:44:55 |
| 239.255.1.2 | #2 | #13 | 00:12:23:34:45:56 |

FIG. 26

| SOURCE IP ADDRESSES FOR THE REQUEST TO START/STOP A MULTICAST TRANSMISSION |
|---|
| 192.0.2.101 |
| 192.0.2.102 |
| 192.0.2.103 |
| |
| |

FIG. 27

| SOURCE MAC ADDRESSES FOR THE REQUEST TO START/STOP A MULTICAST TRANSMISSION |
|---|
| 00:a0:b0:c0:d0:e0 |
| 00:a1:b1:c1:d1:e1 |
| 00:a2:b2:c2:d2:e2 |
| |
| |

FIG. 28

| IP MULTICAST GROUP ADDRESS | SOURCE IP ADDRESS | INPUT INTERFACE | OUTPUT INTERFACE |
|---|---|---|---|
| 239.255.1.1 | 192.0.2.1 | #1 | #11 |
| 239.255.1.1 | 192.0.2.1 | #1 | #12 |
| 239.255.1.2 | 192.0.2.2 | #2 | #13 |
| 239.255.1.2 | 192.0.2.3 | #2 | #13 |

| IP MULTICAST GROUP ADDRESS | SOURCE IP ADDRESS | OUTPUT INTERFACE | DESTINATION MAC ADDRESS |
|---|---|---|---|
| 239.255.1.1 | 192.0.2.1 | #11 | 01:00:5e:7f:01:01 |
| 239.255.1.1 | 192.0.2.1 | #11 | 00:01:02:03:04:05 |
| 239.255.1.1 | 192.0.2.2 | #12 | 00:11:12:13:14:15 |
| 239.255.1.2 | 192.0.2.2 | #13 | 00:11:22:33:44:55 |
| 239.255.1.2 | 192.0.2.3 | #13 | 00:12:23:34:45:56 |

| IP MULTICAST GROUP ADDRESS | SOURCE IP ADDRESS | INPUT INTERFACE | OUTPUT INTERFACE | DESTINATION MAC ADDRESS |
|---|---|---|---|---|
| 239.255.1.1 | 192.0.2.1 | #1 | #11 | 01:00:5e:7f:01:01 |
| 239.255.1.1 | 192.0.2.1 | #1 | #11 | 00:01:02:03:04:05 |
| 239.255.1.1 | 192.0.2.1 | #1 | #12 | 00:11:12:13:14:15 |
| 239.255.1.2 | 192.0.2.2 | #2 | #13 | 00:11:22:33:44:55 |
| 239.255.1.2 | 192.0.2.3 | #2 | #13 | 00:12:23:34:45:56 |

NETWORK SYSTEM, NETWORK APPARATUS AND TRANSFER APPARATUS

CLAIM OF PRIORITY

The present application claims priority from Japanese application JP 2007-212834 filed on Aug. 17, 2007, the content of which is hereby incorporated by reference into this application.

FIELD OF THE INVENTION

The present invention relates to a data transfer system and in particular to a data transfer system for transmitting and receiving IP multicast packets.

BACKGROUND OF THE INVENTION

The telecommunication network infrastructure has been developing and in addition to the traditional data transfer such as web, mail and the like, data transfer of movie or voice and the like is performed on telecommunication networks, and in particular movie data are transferred by multicast. And as a result of the telecommunication network as an infrastructure, the use of telecommunication networks is increasing at home. In the case of home network, not only wired communication but also wireless communication is widely used because of ease of use.

Because of changes in the state of radio wave used in wireless communication, no reliability corresponding to that of wired communication in physical layer can be maintained. Therefore, according to the technology described in "IEEE, AN SI/IEEE Std 802.11, 1999 Edition (R2003)," the mechanism of acknowledging and retransmitting data transfer in the wireless communication set forth in IEEE 802.11 is specified. However, the acknowledgment and retransmission of data transfer in wireless communication are specified only when the wireless communication method is unicast, and they are not specified when the wireless communication method is multicast.

The method of wireless communication is associated with the MAC layer of the transfer data, and the unicast is adopted when the destination address of the MAC layer is the unicast address while the multicast is used when the destination address of the MAC layer is the multicast address. In the multicast used for the broadcast-type distribution of movies, the destination address of the MAC layer is multicast address. Consequently, the data transfer in wireless communication is not acknowledged and retransmitted and as a result their reliability cannot be maintained.

Accordingly, in a multicast communication, in order to maintain reliability by means of the acknowledgment and retransmission of data transfer in wireless communication, JP-A No. 2006-333309 describes a technology of converting a multicast communication into a unicast communication by the transmitter of wireless communication, and reconverting the unicast communication into the multicast communication by the receiver.

And JP-A No. 2007-049382 describes the technology of converting the destination address of the MAC layer of multicast communication from multicast address to unicast address by a transfer apparatus which is a wireless communication apparatus. Since the application that receives a multicast communication processes data in the IP layer, according to the method of converting multicast communication including the IP layer to unicast communication like the technology described in JP-A No. 2007-333309, it is necessary to reconvert to multicast communication. However, according to the method of converting the MAC layer of the multicast communication into the unicast communication and leaving the IP layer in the multicast communication mode like the technology described in JP-A No. 2007-049382, there is no need to reconvert.

And JP-A No. 2004-242063 describes the technology of converting the destination address of the MAC layer of multicast communication from the multicast address to the unicast address irrespective of the wireless communication.

SUMMARY OF THE INVENTION

When the multicast communication is converted into the unicast communication in order to acknowledge and retransmit data transfer in a wireless communication, it is necessary to process the control protocol of multicast communication, to manage the receiver for multicast communication, reproduce multicast communication packets when there are a plurality of receivers according to the information for managing the receivers for multicast communication, and convert the destination address for multicast communication. The processing required for the conversion of these multicast communications will be new load processing for the wireless communication apparatuses. This is the first problem that the present invention tries to solve.

And in the case of converting multicast communication in an apparatus different from the wireless communication apparatus, the receivers requiring the conversion of multicast communication for the sake of wireless communication cannot be identified. This is the second problem which the present invention tries to solve.

A representative example of the present invention is as follows. Specifically, a network system connected with a transmitter for distributing multicast packets and a receiver for transmitting a transfer request packet of the multicast packets to be distributed and for receiving the multicast packets to be distributed, the network system including a transfer apparatus for transferring the multicast packets and the transfer request packets and a network apparatus for receiving the transfer request packets and for transferring the multicast packets to be distributed, the transfer apparatus including two interfaces including a first interface and a second interface, a receiver-transmitter for receiving the transfer request packets for multicast packets through the first interface and for transmitting the transfer request packets through the second interface, the transmitter-receiver transmitting the conversion requests for requesting that the source unicast MAC addresses of the transfer request packets be set as the destination MAC addresses of the multicast packets together with the transfer request packets when it transmits the multicast packets to the receiver requiring unicast communication, the network apparatus including a receiver for receiving the multicast packets, a holding unit for holding the unicast MAC addresses and the multicast MAC addresses used for transferring the received multicast addresses, a reproduction unit for reproducing the same number of the multicast packets as the number of the held unicast MAC addresses and multicast MAC addresses, and a transfer unit for setting any one of the held unicast MAC address and multicast MAC address as the destination MAC address of each of the reproduced multicast packets and transferring the multicast packets in which the destination MAC addresses were set.

According to an embodiment of the present invention, the network apparatus determines whether it is necessary to process the conversion of multicast communication for each receiver terminal, and converts the destination addresses of the MAC layer from the multicast addresses to the unicast addresses when the conversion of the multicast communication is necessary, and does not convert from the multicast addresses to the unicast addresses when the conversion of the multicast communication is not necessary.

Therefore, since the multicast communication is not converted in the wireless communication apparatus, it is possible to alleviate the load of the wireless communication apparatus. And it is possible to convert the multicast communication at the receiver terminal for wireless connection, and to maintain the reliability by the acknowledgment and retransmission of data transfer by wireless communication. Furthermore, it is possible to maintain the simultaneous transmission of the same contents and efficiency of multicasting communication by the receiver terminal of wired connection.

BRIEF DESCRIPTION OF THE DRAWINGS

FIG. 5 shows the routing information table according to the first embodiment of the present invention;

FIG. 6 shows the MAC conversion information table according to the first embodiment of the present invention;

FIG. 7 shows a routing information table obtained by adding the MAC conversion information table to the routing information table according to the first embodiment of the present information;

FIG. 26 shows a conversion execution condition table according to the fourth embodiment of the present invention;

FIG. 27 shows another conversion execution condition table according to the fourth embodiment of the present invention;

FIG. 28 shows a routing information table according to the fifth embodiment of the present invention;

FIG. 29 shows a MAC conversion information table according to the fifth embodiment of the present invention; and FIG. 30 shows a routing information table obtained by adding a MAC conversion information table to the routing information table according to the fifth embodiment of the present invention.

DETAILED DESCRIPTION OF THE PREFERRED EMBODIMENTS

We will describe the embodiments of the present invention with reference to drawings.

First Embodiment

To begin with, we will describe the configuration of the network according to the first embodiment of the present invention.

Figure 1:
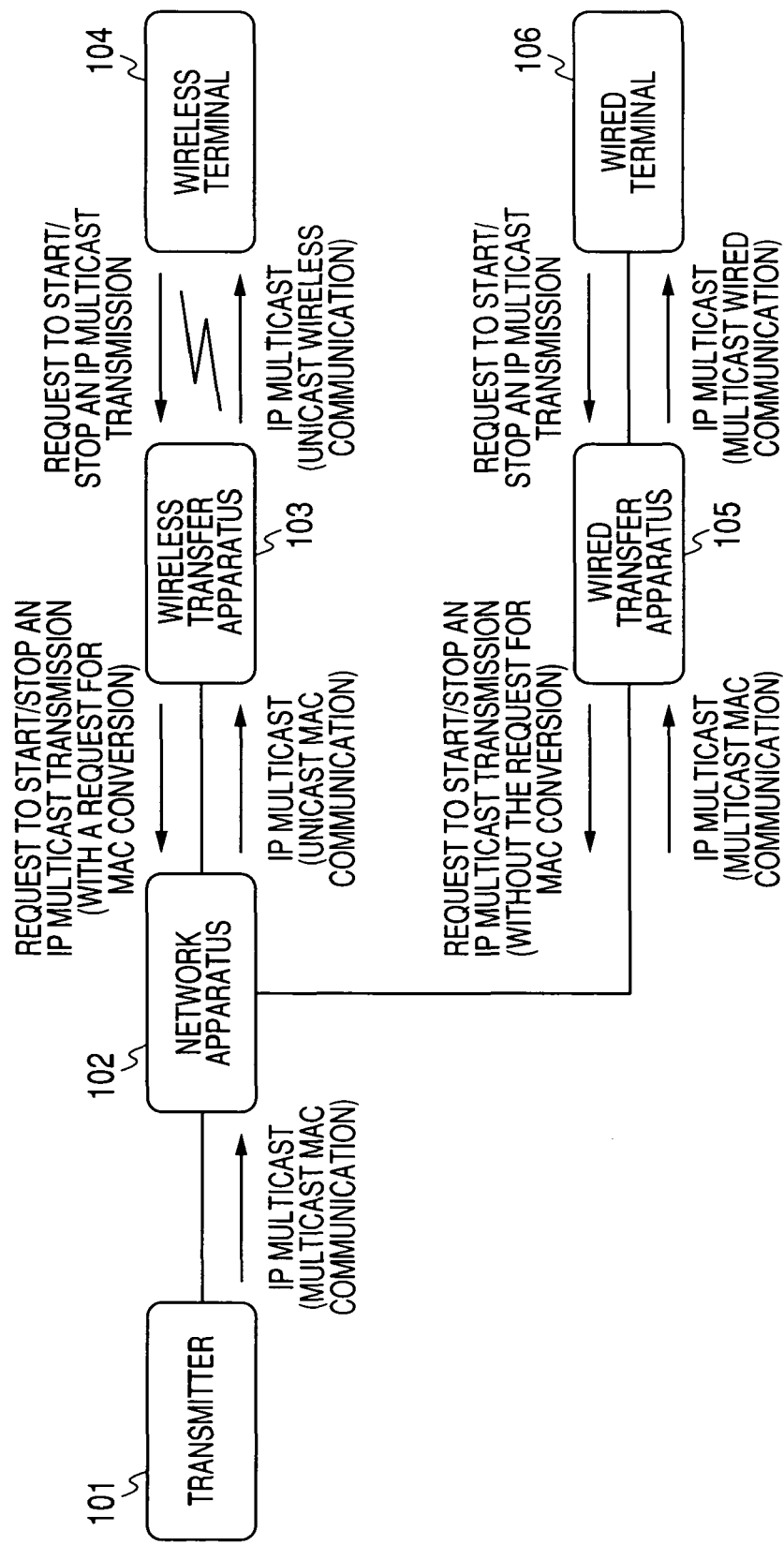
FIG. 1 is the block diagram of the network according to the first embodiment of the present invention.

FIG. 1 is a block diagram of the network according to the first embodiment of the present invention.

The network includes a transmitter 101, a network apparatus 102, a wireless transfer apparatus 103, a wireless terminal 104, a wired transfer apparatus 105 and a wired terminal 106.

The transmitter 101 transmits IP multicast to the network apparatus 102.

The network apparatus 102 receives a request to start an IP multicast transmission and a request to stop the multicast transmission with a request for MAC conversion from the wireless transfer apparatus 103. The term "request for MAC conversion" means a request for setting the source unicast MAC addresses for the IP multicast transmission start request and the IP multicast transmission stop request as the destination MAC addresses of IP multicasts by the network apparatus 102. The expression "with request for MAC conversion" means that a request for MAC conversion is included in the request to be transferred. And the network apparatus 102 receives a request to start an IP multicast transmission and a request to stop the IP multicast transmission without a request for MAC conversion from the wired transfer apparatus 105. The expression "without request for MAC conversion" means that no request for MAC conversion is included in the request to be transferred. And the network apparatus 102 converts the destination MAC addresses of the IP multicast into the MAC addresses of the destination wireless terminals 104 and transmits the IP multicast whose destination MAC addresses have been converted to the wireless transfer apparatus 103. And the network apparatus 102 transmits the IP multicast received from the transmitter 101 to the wired transfer apparatus 105 without converting the destination MAC address of the IP multicast.

The wireless transfer apparatus 103 transmits the request to start the IP multicast transmission and the request to stop the IP multicast transmission received from the wireless terminal 104 to the network apparatus 102 with a request for MAC conversion. And the wireless transfer apparatus 103 transmits the IP multicast received from the network apparatus 102 to the wireless terminal 104.

The wireless terminal 104 transmits the request to start the IP multicast transmission and the request to stop the IP multicast transmission to the wireless transfer apparatus 103. And the wireless terminal 104 receives IP multicast from the wireless transfer apparatus 103.

The wired transfer apparatus 105 transmits the request to start the IP multicast transmission and the request to stop the IP multicast transmission received from the wired terminal 106 to the network apparatus 102 without any request for MAC conversion. And the wired transfer apparatus 105 transmits the IP multicast received from the network apparatus 102 to the wired terminal 106.

The wired terminal 106 transmits the request to start the IP multicast transmission and the request to stop the IP multicast transmission to the wired relay terminal 105. And the wired terminal 106 receives IP multicasts from the wired transfer apparatus 105.

Figure 2:
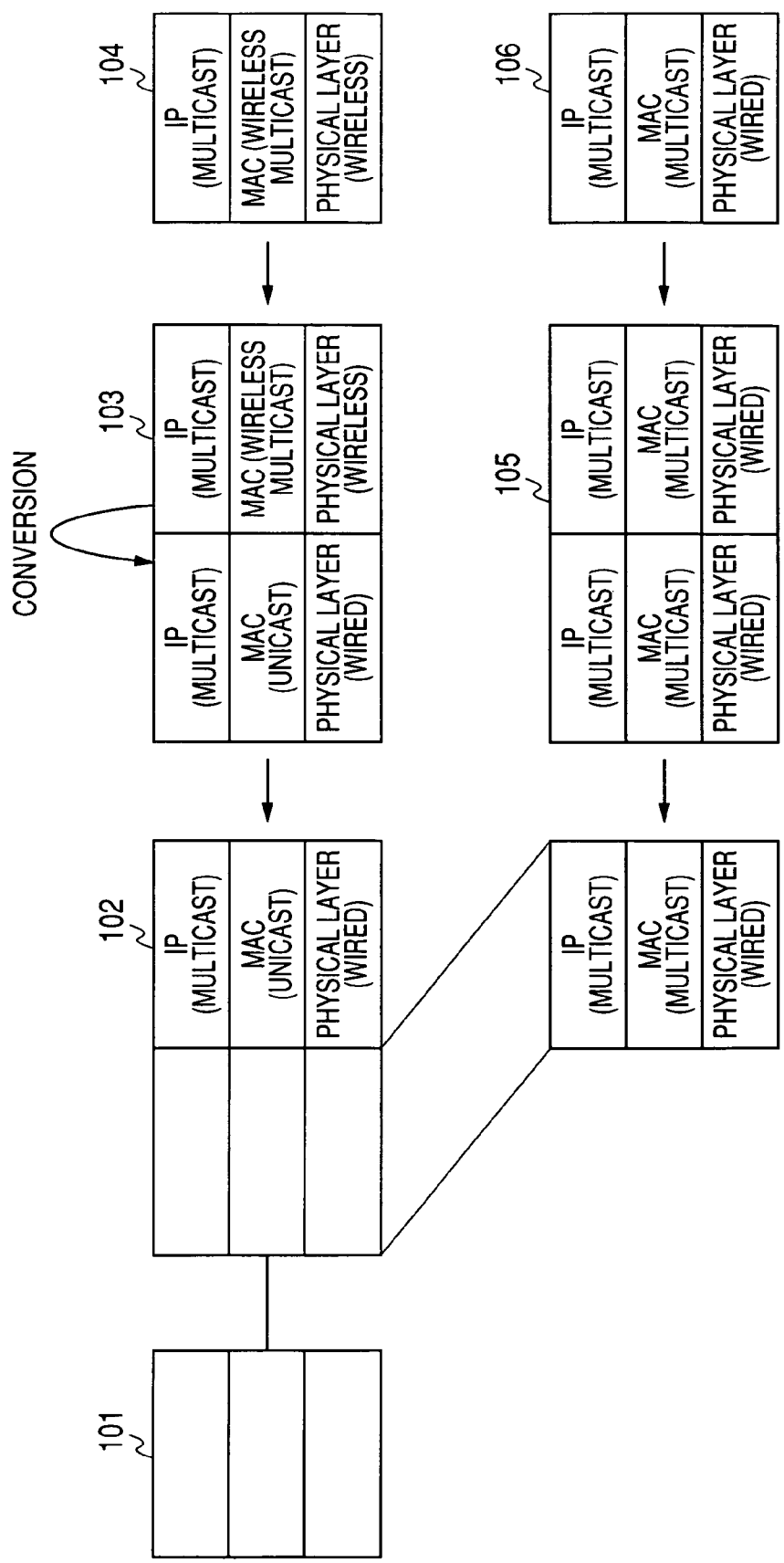
FIG. 2 shows the state of various layers of the IP multicast transmission start request and the IP multicast transmission stop request transmitted and received by various apparatuses shown in FIG. 1 according to the first embodiment of the present invention.

FIG. 2 shows the state of each layer of the request to start IP multicast transmission and the request to stop IP multicast transmission transmitted and received by various apparatuses of the first embodiment of the present invention.

The state of the physical layer includes the wired and wireless state. The state of the MAC layer includes multicast and unicast. And the state of the IP layer includes multicast.

In the request to start the IP multicast transmission and the request to stop the IP multicast transmission, the destination addresses of the MAC layer and the IP layer is normally in the multicast state. The conversion of the destination addresses of the MAC layer into the unicast state and their differentiation from the normal request lead to show whether the request to start the IP multicast transmission and the request to stop the IP multicast transmission include any request for MAC conversion.

Upon receipt of a request to start the IP multicast transmission and a request to stop the IP multicast transmission from the wireless terminal 104, the wireless transfer apparatus 103 converts the destination addresses of the MAC layer of the request to start the IP multicast transmission and the request to stop the IP multicast transmission into the unicast MAC addresses of the network apparatus 102, and transmits the same to the network apparatus 102.

And upon receipt of a request to start the IP multicast transmission and a request to stop the IP multicast transmission from the wired terminal 106, the wired transfer apparatus 105 transmits the destination addresses of the MAC layer to the network apparatus 102 keeping the multicast MAC addresses without any conversion.

Figure 3:
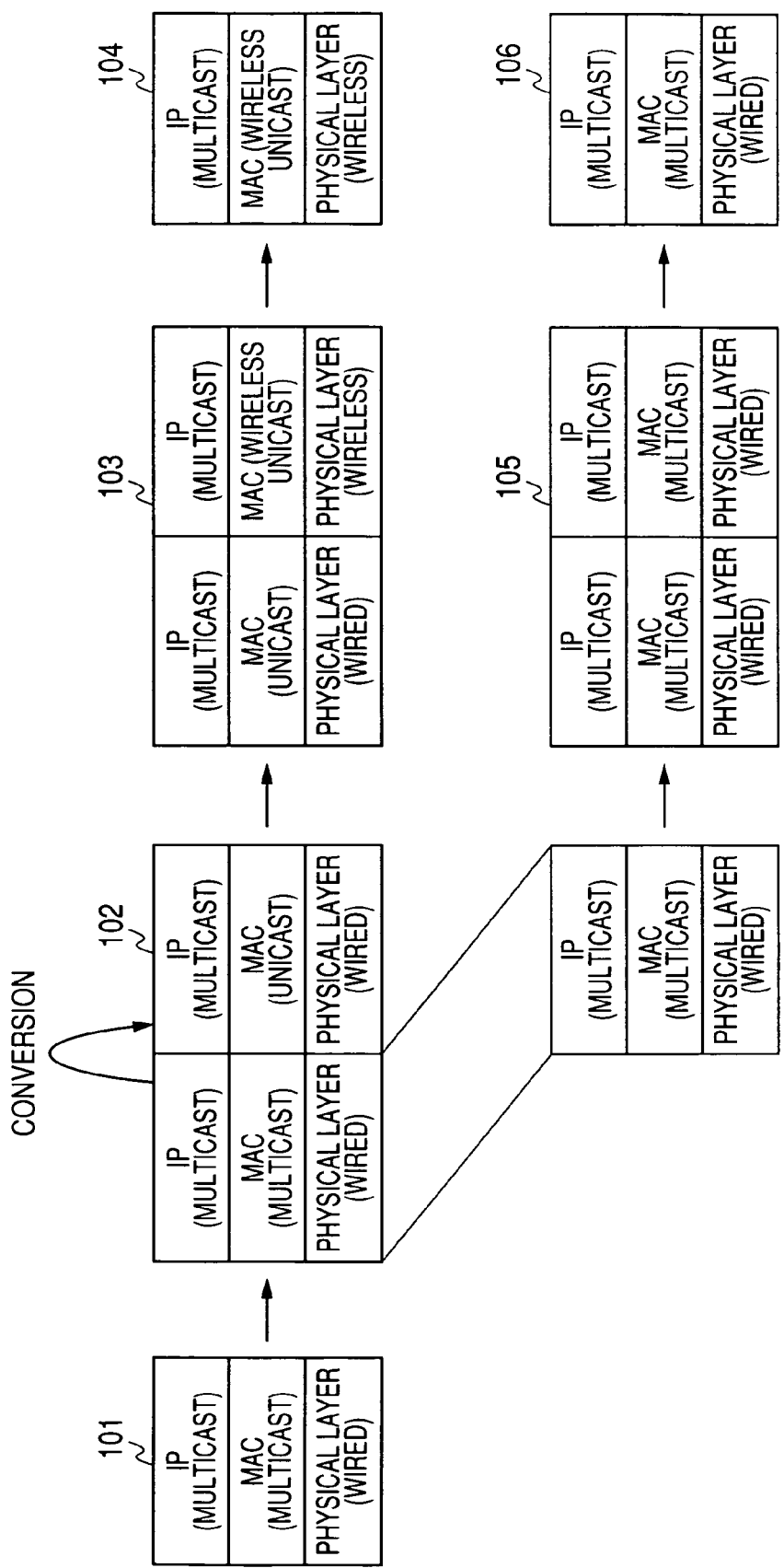
FIG. 3 shows the state of various layers of the IP multicast transmitted and received by various apparatuses shown in FIG. 1 according to the first embodiment of the present invention.

The network apparatus 102 determines whether the destination addresses of the MAC layer of the request to start the IP multicast transmission and the request to stop the IP multicast transmission are unicast addresses or multicast addresses. As shown in FIG. 3, if the destination addresses of the MAC layer of the IP multicast transmission start request and the IP multicast transmission stop request are unicast addresses, the network apparatus 102 converts the MAC layer of the IP multicast received into the unicast, and if they are multicast addresses, it relays the MAC layer of the IP multicast received keeping the multicast state without conversion.

FIG. 3 shows the state of each layer of the IP multicast transmitted and received by various apparatuses of the first embodiment of the present invention.

The state of the physical layer includes the wired and wireless state. The state of the MAC layer includes multicast and unicast. And the state of the IP layer includes multicast.

The transmitter 101 transmits the IP multicast of the physical layer (wired), the MAC layer (multicast) and the IP layer (multicast) to the network apparatus 102.

The network apparatus 102 converts the MAC layer of the IP multicast received from the transmitter 101 into the MAC addresses of the wireless terminals 104, and transmits the IP multicast of the physical layer (wired), the MAC layer (unicast) and the IP layer (multicast) to the wireless transfer apparatus 103. And the network apparatus 102, without converting the MAC layer of the IP multicast received from the transmitter 101, transmits the IP multicast of the physical layer (wired), the MAC layer (multicast) and the IP layer (multicast) to the wired transfer apparatus 105.

The wireless transfer apparatus 103 receives the IP multicast of the MAC layer (unicast) from the network apparatus 102, converts the physical layer and the MAC layer into wireless and transmits the IP multicast of the physical layer (wireless), the MAC layer (wireless, unicast) and the IP layer (multicast) to the wireless terminals 104.

The wireless terminal 104 receives the IP multicast of the physical layer (wireless), the MAC layer (wireless, unicast) and the IP layer (multicast) from the wireless transfer apparatus 103.

The wired transfer apparatus 105 receives the IP multicast of the MAC layer (multicast) from the network apparatus 102, and transmits the IP multicast of the physical layer (wired), the MAC layer (multicast) and the IP layer (multicast) to the wired apparatus 106.

The wired terminal 106 receives the IP multicast of the physical layer (wired), the MAC layer (multicast) and the IP layer (multicast) from the wired transfer apparatus 105.

Figure 4:
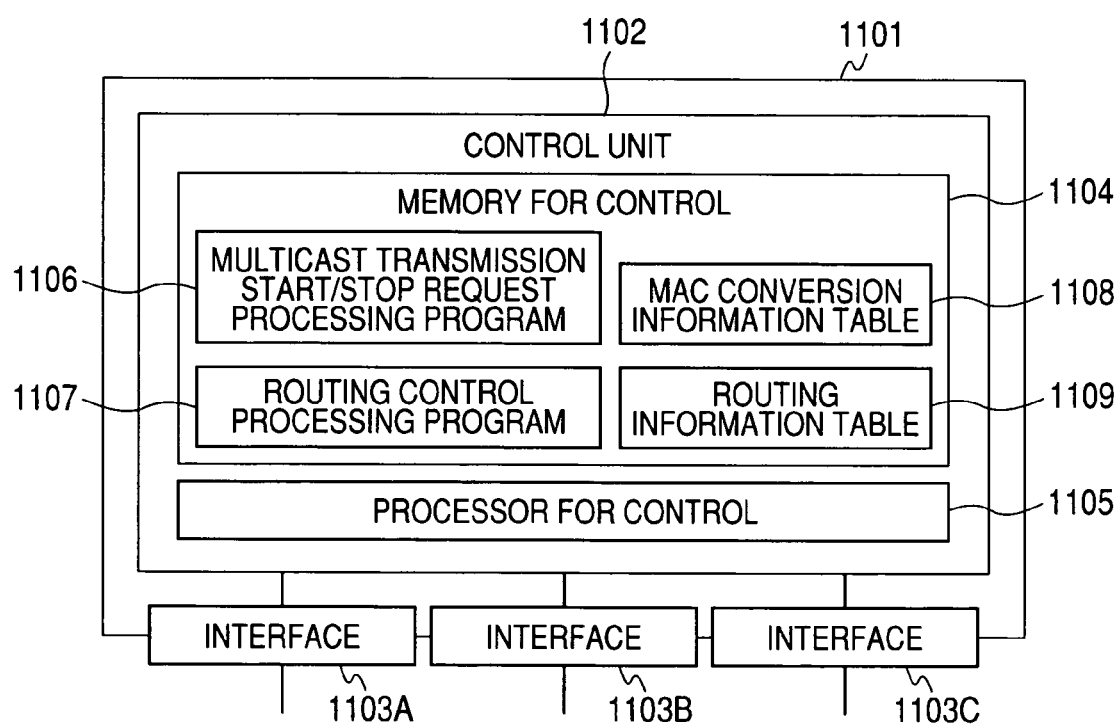
FIG. 4 is the block diagram of the network apparatus according to the first embodiment of the present invention.

FIG. 4 is an illustration of the constitution of the network apparatus according to the first embodiment of the present invention.

The network apparatus 1101 includes a control unit 1102, and interfaces 1103 (1103A, 1103B, 1103C). Incidentally, the network apparatus 1101 corresponds to the network apparatus 102 shown in FIG. 1.

The control unit 1102 includes a control memory 1104 and a control processor 1105. The control memory 1104 includes a multicast transmission start/stop request processing program 1106, a routing control processing program 1107, a MAC conversion information table 1108 and a routing information table 1109.

The multicast transmission start/stop request processing program 1106 prepares the relay information of the IP multicast. Specifically, based on the IP multicast transmission start request or the IP multicast transmission stop request received from the wireless transfer apparatus 103 or the wired transfer apparatus 105, it prepares or deletes the MAC conversion information table 1108 and the routing information table 1109.

In order to transfer the IP multicast received from the transmitter 101, the routing control processing program 1107 controls the routing of the IP multicast based on the MAC conversion information table 1108 and the routing control table 1109.

The MAC conversion information table 1108 holds the information on the destination MAC addresses to which the IP multicasts are to be transmitted.

The routing information table 1109 holds the information on the interface for transmitting and receiving the IP multicast.

The control processor 1105 executes the program housed within the control memory 1104.

The interface 1103 is connected with the control unit 1102 and transmits or receives data to or from outside. Incidentally, FIG. 3 shows three interfaces. However, any number other than three may be used.

FIG. 5 shows a routing information table according to the first embodiment of the present invention.

The routing information table 1109 includes IP multicast group addresses 2101, an input interface 2102 and an output interface 2103.

The IP multicast group addresses 2101 are the destination addresses of the IP layer used at the time of distributing IP multicasts. The input interface 2102 is an interface through which the network apparatus 102 receives IP multicast. The output interface 2103 is an interface through which the network apparatus 102 transmits IP multicasts.

FIG. 6 shows a MAC conversion information table according to the first embodiment of the present invention.

The MAC conversion information table 1108 includes IP multicast group addresses 2201, an output interface 2202, and destination MAC addresses 2203.

The IP multicast group addresses 2201 are the destination addresses of the IP layer to be used at the time of distribution of IP multicasts. The output interface 2202 is an interface through which the network apparatus 102 transmits IP multicasts. The destination MAC addresses 2203 are MAC addresses to be set as the destination MAC addresses of the IP multicasts to be transmitted by the network apparatus 102.

For example, the column 2211 represents information to be set when it is not necessary to convert the destination MAC addresses of the IP multicast into unicast. In this case, the MAC address 01:00:5e:7f:01:01 corresponding to the IP multicast group address 239.255.1.1 is set as the destination MAC address 2203. The MAC address corresponding to this IP multicast group address agrees with the MAC address set as the destination MAC address of the IP multicast whose destination MAC address has not been converted. And the columns 2212-2215 represent information to be set when the destination MAC address of the IP multicast needs to be converted into unicast. In this case, the MAC address of the receiver terminal having requested the transmission of the IP multicast is set as the destination MAC address 2203.

Incidentally, the network apparatus 102 according to the first embodiment of the present invention houses separately the routing information table 1109 and the MAC conversion information table 1108. However, as shown in FIG. 7, the information of the MAC conversion table 1108 may be added to the routing information table 1109.

FIG. 7 shows an example of a routing information table wherein a MAC conversion information table is added to the routing information table according to the first embodiment of the present invention.

The routing information table shown in FIG. 7 includes the IP multicast group address 2301, the input interface 2302, the output interface 2303 and the destination MAC address 2304.

We omit the description of the details of various items shown in FIG. 7 because they are similar to those shown in FIG. 5 and FIG. 6. Incidentally, the IP multicast group address 2301 corresponds with the IP multicast group address 2101, the input interface 2302 corresponds with the input interface 2102, the output interface 2303 corresponds with the output interface 2103, and the destination MAC address 2304 corresponds with the destination MAC address 2203.

Thus, it is possible to realize the present invention if the network apparatus 102 includes only a routing information table to which a MAC conversion information table is added.

Figure 8:
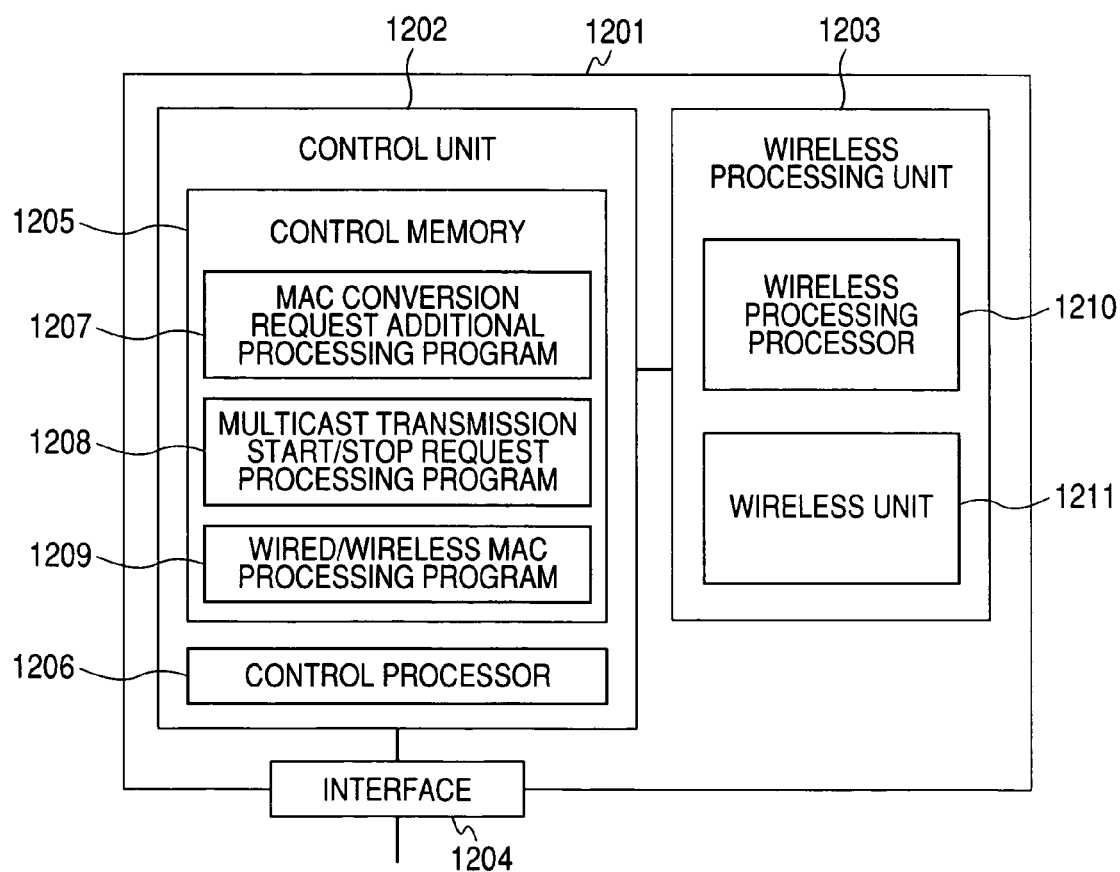
FIG. 8 is a block diagram of the wireless transfer apparatus according to the first embodiment of the present information.

FIG. 8 is an illustration of structure of the wireless transfer apparatus according to the first embodiment of the present invention.

The wireless transfer apparatus 1201 includes a control unit 1202, a wireless processing unit 1203 and an interface 1204. Incidentally, the wireless transfer apparatus. 1201 corresponds with the wireless transfer apparatus 103 shown in FIG. 1.

The control unit 1202 includes a control memory 1205 and a control processor 1206.

The control memory 1205 includes a MAC conversion request additional processing program 1207, a multicast transmission start/stop request processing program 1208 and a wire/wireless MAC processing program 1209.

The MAC conversion request additional processing program 1207 adds the MAC conversion request to the IP multicast transmission start request or the IP multicast transmission stop request received from the wireless terminal 104.

The multicast transmission start/stop request processing program 1208 transfers the IP multicast transmission start request or the IP multicast transmission stop request received from the wireless terminal 104 to the network apparatus 102.

The wired/wireless MAC processing program 1209 switches the state of data transmitted or received in the physical layer from wired to wireless or from wireless to wired.

The control processor 1206 is a processor for executing the program held in the control memory 1205.

The wireless processing unit 1203 includes a wireless processing processor 1210 and a wireless unit 1211.

The wireless processing processor 1210 is a processor for mutually converting data signals and wireless signals and for controlling the retransmission of wireless communication. The wireless unit 1211 transmits and receives wireless signals.

The interface 1204 is connected with the control unit 1202 and transmits and receives data to and from the outside. Incidentally, FIG. 8 shows only an interface. However, a plurality of interfaces may be provided.

Incidentally, the network structure according to the first embodiment of the present invention includes separately a network apparatus 102 and a wireless transfer apparatus 103. However, as shown in FIG. 9, the function of a wireless transfer apparatus 103 may be added to the network apparatus 102.

Figure 9:
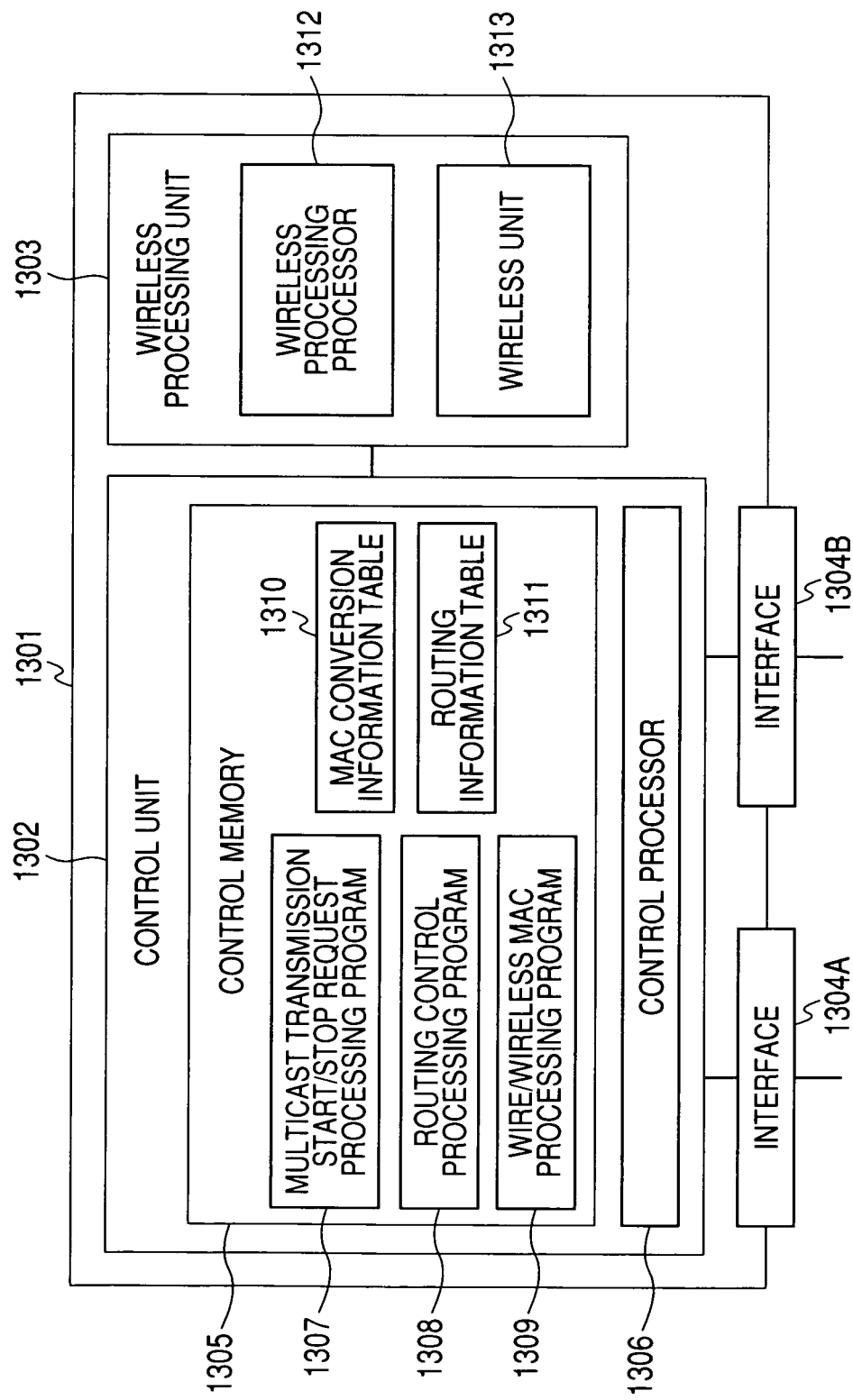
FIG. 9 is the block diagram of a network apparatus obtained by adding the function of a wireless transfer apparatus to the network apparatus according to the first embodiment of the present invention.

FIG. 9 is an illustration of configuration of the network apparatus obtained by adding the function of a wireless transfer apparatus to the network apparatus according to the first embodiment of the present invention.

The network apparatus 1301 shown in FIG. 9 is a variation of the network apparatus 102 according to the first embodiment obtained by combining the same with the function of a wireless transfer apparatus 103. Incidentally, it is possible to construct a network by using a network apparatus 1301 in the place of the network apparatus 102 and the wireless transfer apparatus 103 shown in FIG. 1.

The network apparatus 1301 shown in FIG. 9 includes a control unit 1302, a wireless processing unit 1303, and interfaces 1304 (1304A, 1304B).

The control unit 1302 includes a control memory 1305 and a control processor 1306. The control memory 1305 houses a multicast transmission start/stop request processing program 1307, a routing control processing program 1308, a wired/wireless MAC processing program 1309, a MAC conversion information table 1310, and a routing information table 1311.

The wireless processing unit 1303 includes a wireless processing processor 1312 and a wireless unit 1313.

We omit the detailed description of each item because they are identical with those shown in FIG. 4 and FIG. 8. Incidentally, the multicast transmission start/stop request processing program 1307 corresponds to the multicast transmission start/stop request processing program 1106, the routing control processing program 1308 corresponds to the routing control processing program 1107, the wired/wireless MAC processing program 1309 corresponds to the wired/wireless MAC processing program 1209, and the control processor 1306 corresponds to the control processor 1105. Moreover, the MAC conversion information table 1310 corresponds to the MAC conversion information table 1108, and the routing information table 1311 corresponds to the routing information table 1109. And the wireless processing processor 1312 corresponds to the wireless processing processor 1210, the wireless unit 1313 corresponds to the wireless unit 1211, and the interface 1304 corresponds to the interface 1103.

And since the network apparatus 1301 shown in FIG. 9 requires no addition of requests for MAC conversion, the MAC conversion request addition processing program 1207 shown in FIG. 8 becomes unnecessary.

Thus, by adding the function of a wireless transfer apparatus to the network apparatus, it will be possible to realize the functions of a network apparatus and the wireless transfer apparatus in a single apparatus.

Figure 10:
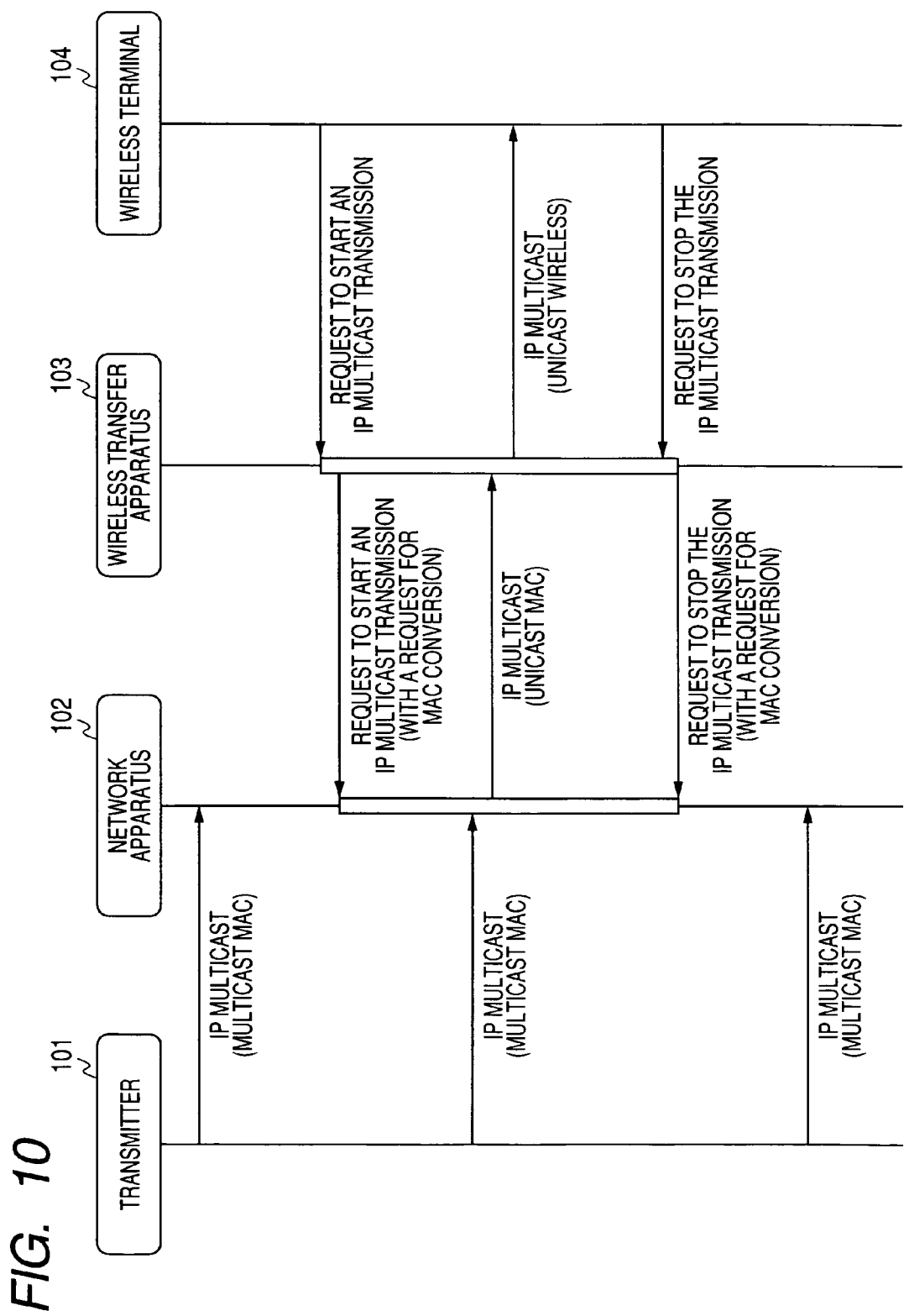
FIG. 10 is a sequence diagram for processing the IP multicast transmission start request and the IP multicast transmission stop request from a wireless terminal requiring the conversion of the MAC layer according to the first embodiment of the present invention.

FIG. 10 is a sequence diagram for processing the IP multicast transmission start request and the IP multicast transmission stop request received from the wireless terminal indicating the necessity of converting the MAC addresses in the MAC layer according to the first embodiment of the present invention.

To begin with, the wireless terminal 104 transmits an IP multicast transmission start request to the wireless transfer apparatus 103. Upon receipt of an IP multicast transmission start request from the wireless terminal 104, the wireless transfer apparatus 103 transmits an IP multicast transmission start request with a request for MAC conversion to the network apparatus 102.

Then, upon receipt of an IP multicast transmission request from the wireless terminal 103, the network apparatus 102 prepares IP multicast relay information including MAC conversion information.

Then, the network apparatus 102 converts the destination MAC addresses of the IP multicast received from the transmitter 101 to the unicast MAC addresses of the wireless terminal 104 based on the IP multicast relay information prepared and transmits the converted IP multicast to the wireless transfer apparatus 103. The wireless transfer apparatus 103 transmits the IP multicast received from the network apparatus 102 to the wireless terminal 104.

Then, the wireless terminal 104 transmits the IP multicast transmission stop request to the wireless transfer apparatus 103. Upon receipt of the IP multicast transmission stop request from the wireless terminal 104, the wireless transfer apparatus 103 transmits the IP multicast transmission stop request with a request for MAC conversion to the network apparatus 102.

Then, upon receipt of the IP multicast transmission stop request with a request for MAC conversion from the wireless transfer apparatus 103, the network apparatus 102 deletes the IP multicast relay information including the MAC conversion information prepared.

Figure 11:
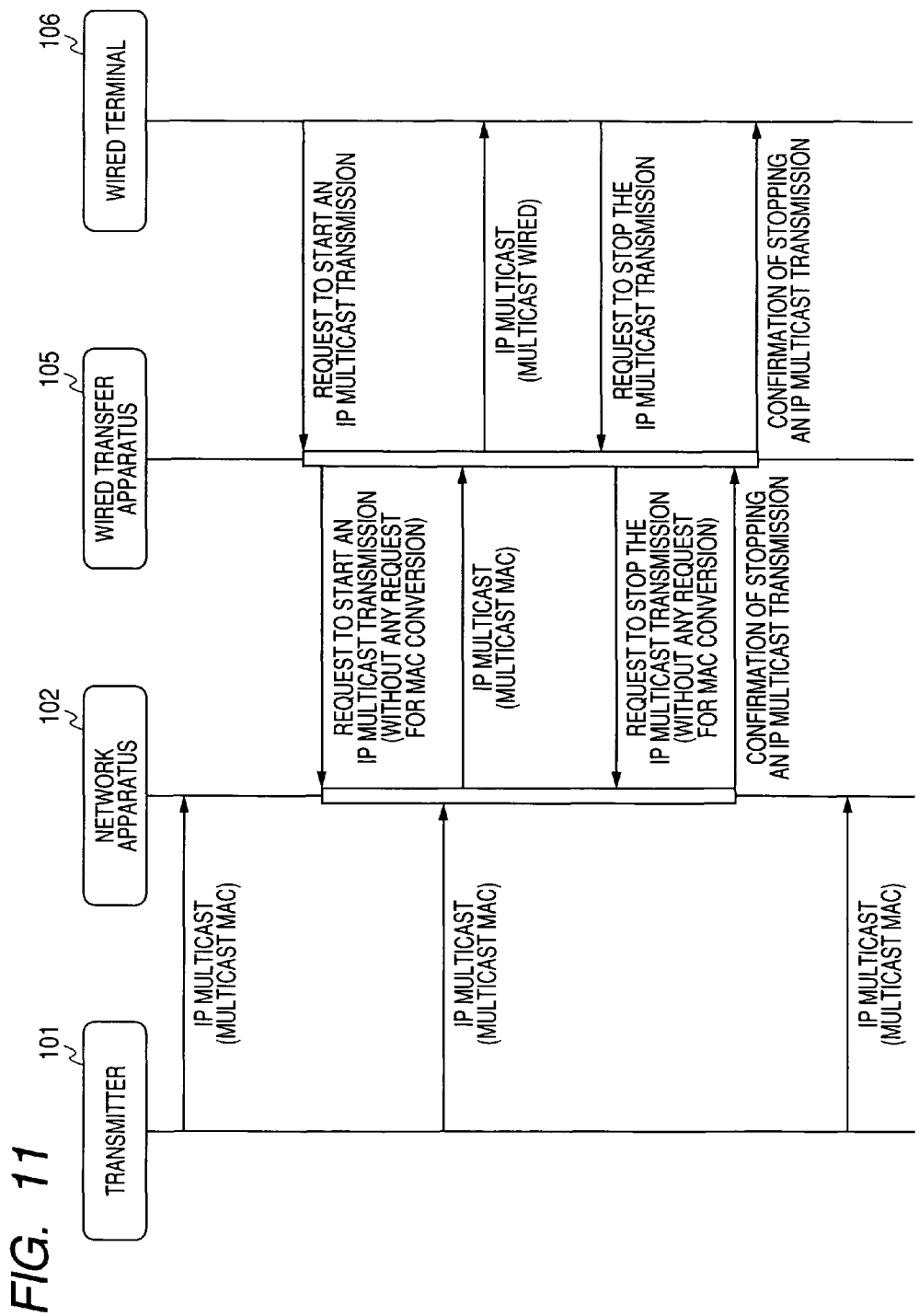
FIG. 11 is a sequence diagram for processing the IP multicast transmission start request and the IP multicast transmission stop request from a wired terminal not requiring the conversion of the MAC layer according to the first embodiment of the present invention.

FIG. 11 is a sequence diagram for processing the request to start the IP multicast transmission and the request to stop the IP multicast transmission from the wired terminal not requiring the conversion of the MAC layer according to the first embodiment of the present invention.

To begin with, the wired terminal 106 transmits an IP multicast transmission start request to the wired transfer apparatus 105. Upon receipt of the IP multicast transmission start request from the wired terminal 106, the wired transfer apparatus 105 transmits an IP multicast transmission start request without any request for MAC conversion to the network apparatus 102.

Then, upon receipt of an IP multicast transmission start request without any request for MAC conversion from the wired transfer apparatus 105, the network apparatus 102 prepares IP multicast relay information without any information on MAC conversion.

Then, the network apparatus 102 transmits the IP multicast received from the transmitter 101 to the wired transfer apparatus 105 based on the IP multicast relay information prepared. The wired transfer apparatus 105 transmits the IP multicast received from the network apparatus 102 to the relay terminal 106.

Then, the wired terminal 106 transmits an IP multicast transmission stop request to the wired transfer apparatus 105. Upon receipt of the IP multicast transmission stop request from the wired terminal 106, the wired transfer apparatus 105 transmits the IP multicast transmission stop request without any request for MAC conversion to the network apparatus 102.

Then, upon receipt of the IP multicast transmission stop request without any request for MAC conversion from the wired transfer apparatus 105, the network apparatus 102 transmits the confirmation of stopping the IP multicast to the wired transfer apparatus 105. The wired transfer apparatus 105 transmits the confirmation of stopping the IP multicast received from the network apparatus 102 to the wired terminal 106.

Then, in the absence of response to the confirmation of stopping the IP multicast transmission during a predetermined period of time from the wired terminal 106, the network apparatus 102 deletes the IP multicast relay information prepared without any request for MAC conversion.

Figure 12:
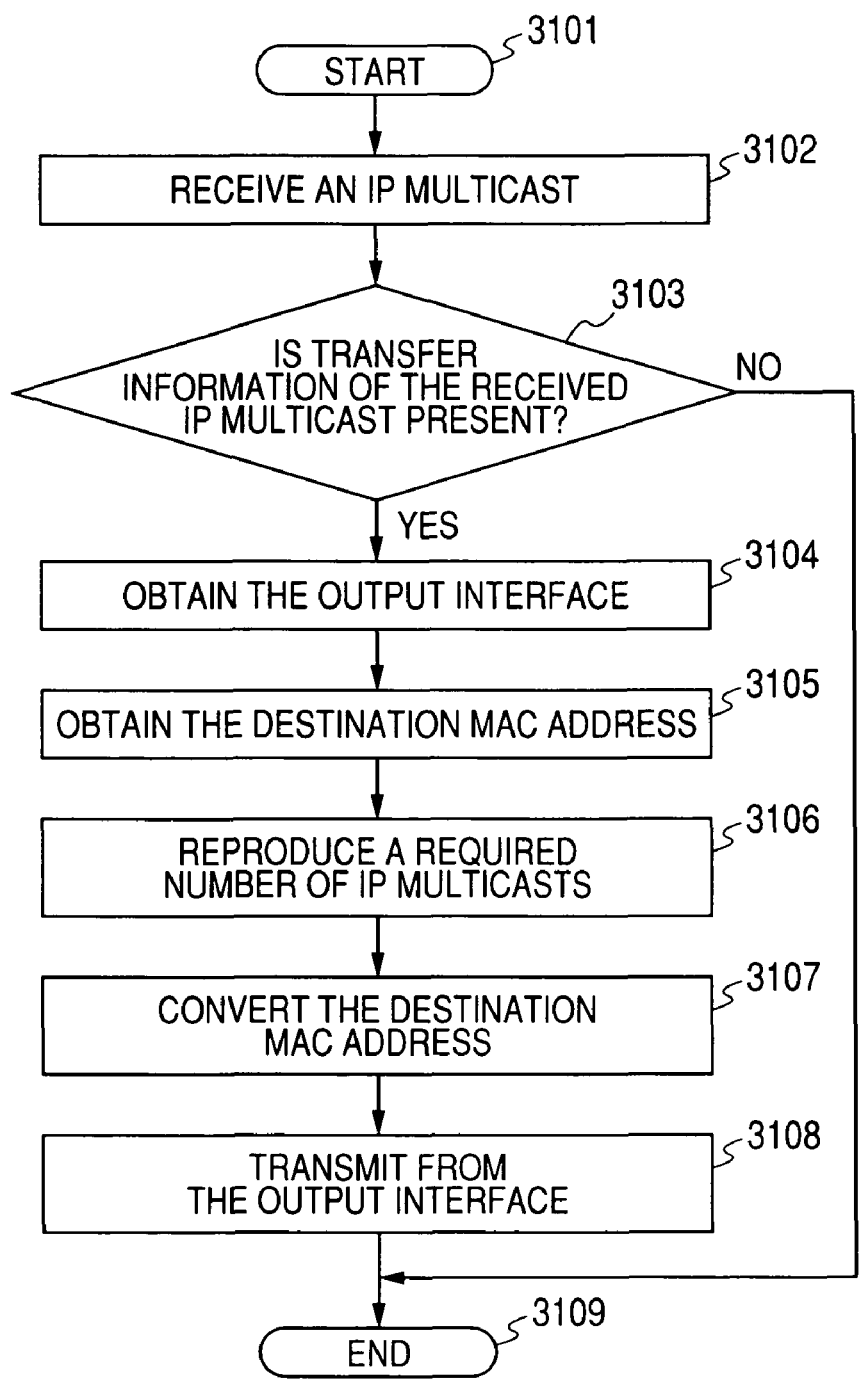
FIG. 12 shows a flowchart for processing the routing control of the network apparatus according to the first embodiment of the present invention.

FIG. 12 shows a flowchart of routing control processing of the network apparatus according to the first embodiment of the present invention.

To begin with, the network apparatus 102 receives an IP multicast from the transmitter 101 (3102).

Then, the network apparatus 102 refers the routing information table 1109 to determine whether the relay information of the IP multicast received exists or not (3103). If it is determined in the step 3103 that the output interface 2103 corresponding to the IP multicast group addresses 2101 of the IP multicast exists in the routing information table 1109, the process advances to the step 3104. On the other hand, it is not found in the routing information table 1109, the IP multicast received is disposed and the processing is terminated.

In the step 3104, the network apparatus 102 refers the routing information table 1109 and acquires the interface indicated by the output interface 2103 corresponding to the IP multicast group addresses 2101 of the IP multicast (3104).

Then, the network apparatus 102 refers the MAC conversion information table 1108 and acquires the MAC addresses indicated by the destination MAC addresses 2203 corresponding to the IP multicast group addresses 2201 of the IP multicast (3105).

Then, the network apparatus 102 reproduces as many IP multicasts as necessary to relay (3106). Specifically, the network apparatus 102 reproduces as many IP multicasts as there are the destination MAC addresses 2203 corresponding to the IP multicast group addresses 2201.

Then, the network apparatus 102 converts the destination MAC addresses of the IP multicast (3107). Specifically, the network apparatus 102 sets the destination MAC addresses acquired in the step 3105 as the destination MAC addresses of each IP multicast that had been reproduced in the step 3106. Incidentally, if the destination MAC addresses of the IP multicast agree with the destination MAC addresses acquired in the step 3105, it is not necessary to convert the destination MAC addresses of the IP multicast.

Then, the network apparatus 102 transmits IP multicast from the output interface (3108). Specifically, the network apparatus 102 transmits IP multicast from the output interface acquired in the step 3104. And the network apparatus 102 stops processing (3109).

Figure 13:
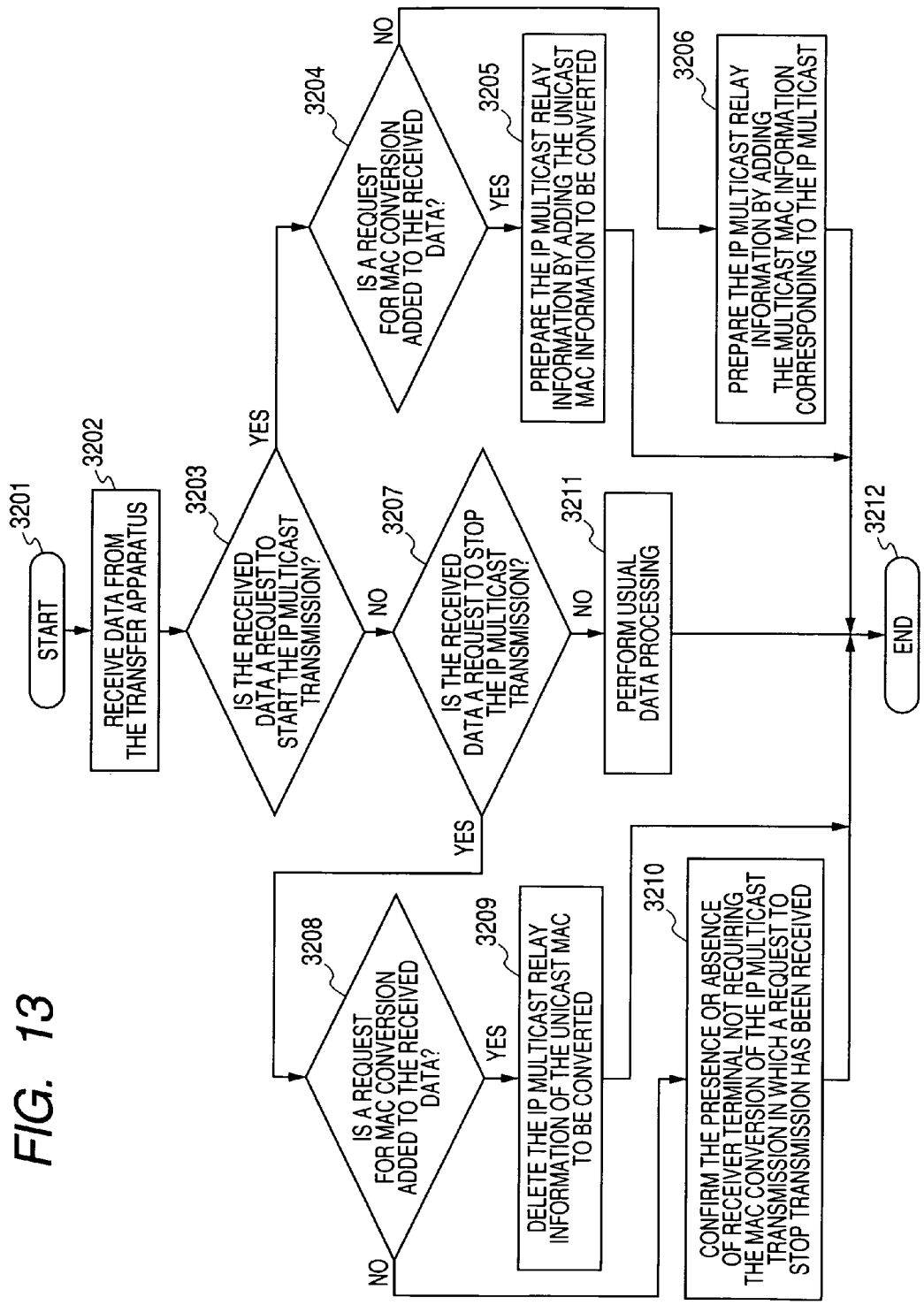
FIG. 13 shows a flowchart for processing the multicast transmission start/stop request of the network apparatus according to the first embodiment of the present invention.

FIG. 13 shows a flowchart for processing the multicast transmission start/stop request of the network apparatus according to the first embodiment of the present invention.

To begin with, the network apparatus 102 receives data from the transfer apparatus (wireless transfer apparatus 103 or wired transfer apparatus 105) (3202).

Then, the network apparatus 102 determines whether the data received contain an IP multicast transmission start request or not (3203). If it is determined in the step 3203 that the data received contain an IP multicast transmission start request, the process advances to the step 3204. On the other hand, if the data received is not an IP multicast transmission start request, the process advances to the step 3207.

In the step 3204, the network apparatus 102 determines whether the data received is an IP multicast transmission start request (3204). If it is determined in the step 3204 that the data received is an IP multicast transmission start request, the process advances to the step 3205. On the other hand, if the data received contained no MAC conversion request, the process advances to the step 3206.

In the step 3205, the network apparatus 102 prepares IP multicast relay information based on the unicast MAC information to be converted (3205). Specifically, the network apparatus 102 prepares a routing information table 1109 shown in FIG. 5 based on the IP multicast transmission start request received, and prepares a MAC conversion information table 1108 shown in FIG. 6 based on the source unicast MAC addresses information requesting to start the IP multicast transmission received. And then it terminates processing.

In the step 3206, the network apparatus 102 prepares IP multicast relay information based on the multicast MAC information corresponding to the IP multicast (3206). Specifically, the network apparatus 102 prepares the routing information table 1109 shown in FIG. 5 based on the IP multicast transmission start request received, and prepares the MAC conversion information table 1108 shown in FIG. 6 based on the multicast MAC addresses information corresponding to the IP multicast. Then, it terminates processing.

In the step 3207, the network apparatus 102 determines whether the data received is an IP multicast transmission stop request or not. If it is determined in the step 3207 that the data received is an IP multicast transmission stop request, the process advances to the step 3208. On the other hand, if the data received is not an IP multicast transmission stop request, in the step 3211 normal data processing is executed and the processing is terminated.

In the step 3208, the network apparatus 102 determines whether a MAC conversion request is added to the data received or not (3208). If it is determined in the step 3208 that a MAC conversion request has been added to the data received, the process advances to the step 3209. On the other hand, if no MAC conversion request is added to the data received, the process advances to the step 3210.

In the step 3209, the network apparatus 102 deletes the IP multicast relay information of the unicast MAC to be converted (3209) and terminates the processing.

In the step 3210, the network apparatus 102 confirms whether any receiver terminal has received a request for stopping transmission for which there is no need of MAC conversion of IP multicast (3210) and terminates the processing.

Figure 14:
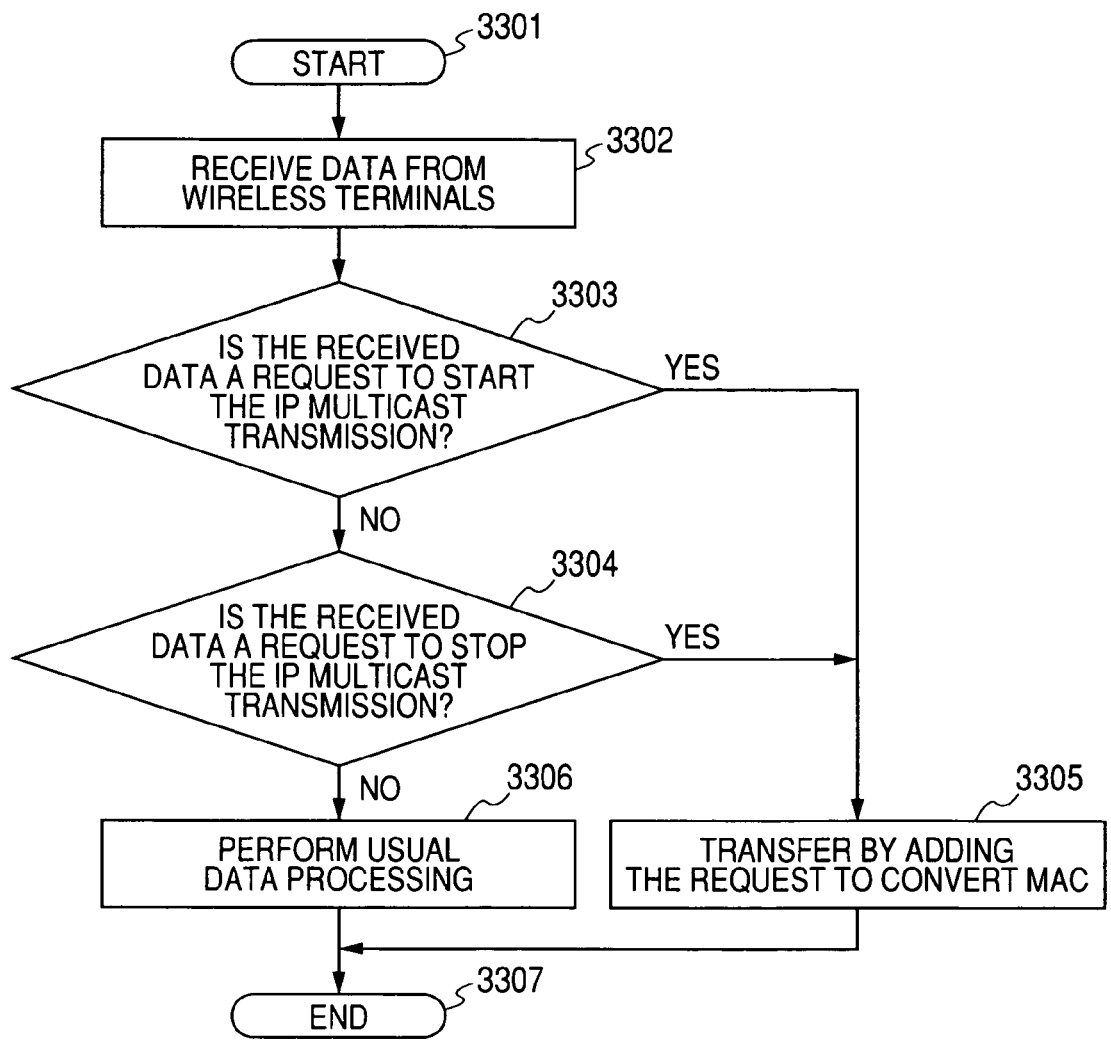
FIG. 14 shows a flowchart for processing the addition of the request for MAC conversion to the wireless transfer apparatus according to the first embodiment of the present invention.

FIG. 14 shows the flowchart of processing the addition of a MAC conversion request to the wireless transfer apparatus according to the first embodiment of the present invention.

To begin with, the wireless transfer apparatus 103 receives data from the wireless terminal 104 (3302).

Then, the wireless transfer apparatus 103 determines whether the data received is an IP multicast transmission start request or not (3303). If it is determined in the step 3303 that the data received is not an IP multicast transmission start request, the process advances to the step 3304. On the other hand, if the data received is an IP multicast transmission start request, the process advances to the step 3305.

In the step 3304, the wireless transfer apparatus 103 determines whether the data received is an IP multicast transmission stop request or not (3304). If it is determined in the step 3304 that the data received is an IP multicast transmission stop request, the process advances to the step 3305. On the other hand, if the data received is not an IP multicast transmission start request, the process advances to the step 3306, and the wireless transfer apparatus 103 executes the normal data processing and terminates the processing.

In the step 3305, the wireless transfer apparatus 103 adds the MAC conversion request and transmits to the network apparatus 102 (3305). Specifically, the wireless transfer apparatus 103 adds a MAC conversion request to an IP multicast transmission start request or an IP multicast transmission stop request and transmits an IP multicast transmission start request or an IP multicast transmission stop request coupled with a MAC conversion request to the network apparatus 102. And the wireless transfer apparatus 103 stops the processing.

Second Embodiment

The second embodiment of the present invention is an example wherein the wired terminals requiring the transmission of the IP multicast must be controlled individually. The case where wired terminals must be controlled individually means the case wherein the quality of transmission of IP multicast to separate wired terminals must be controlled.

Figure 15:
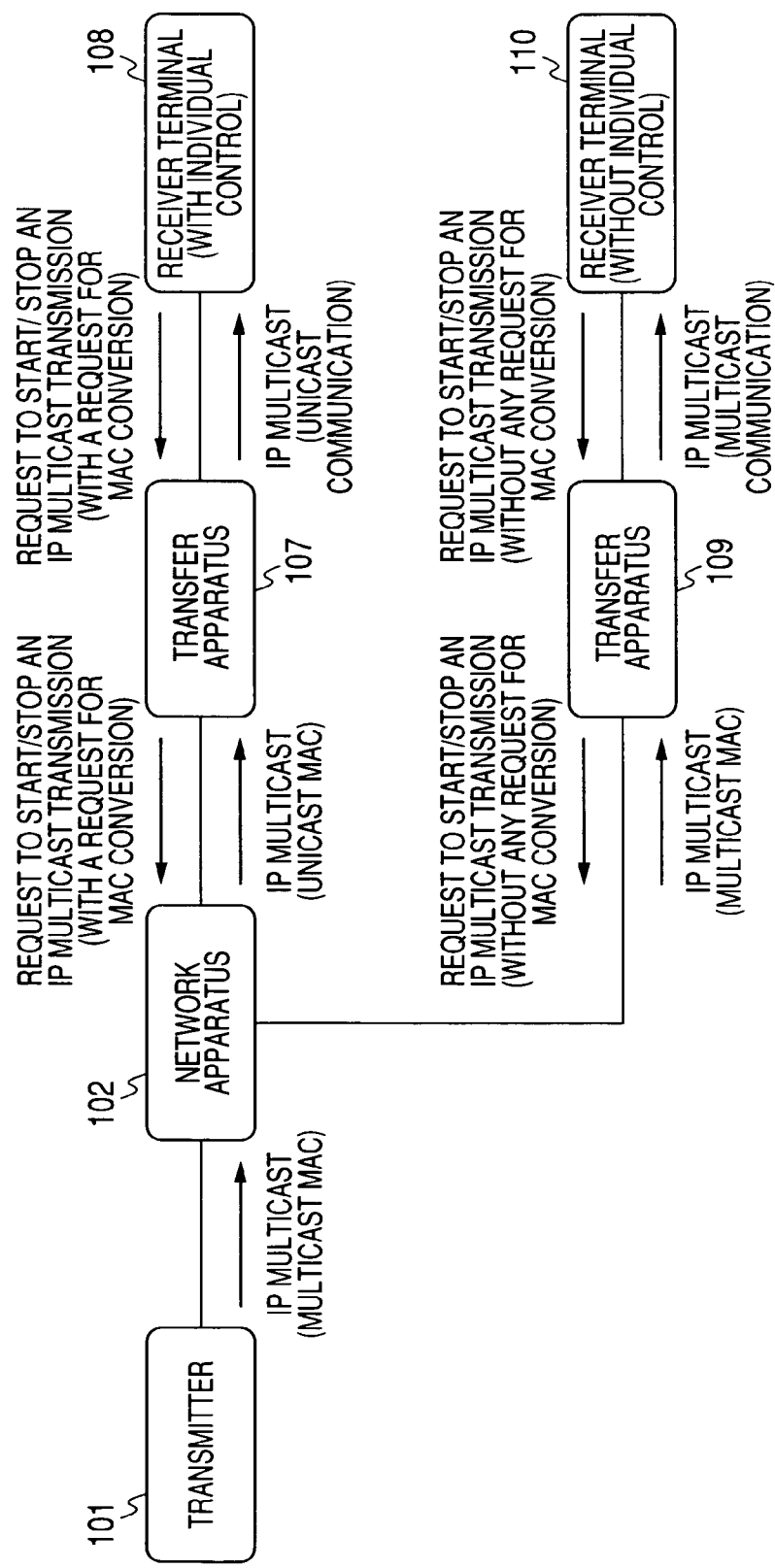
FIG. 15 is the block diagram of the network according to the second embodiment of the present invention.

FIG. 15 is a diagram of configuration of the network according to the second embodiment of the present invention.

The network includes a transmitter 101, a network apparatus 102, a transfer apparatus 107, a receiver terminal (with separate control) 108, a transfer apparatus 109 and a receiver (without separate control) 110.

The difference with the first embodiment lies in the fact that the receiver terminals 108 and 110 connected with the transfer apparatus are both connected with wires and that the necessity of individual control of the transfer apparatuses cannot be judged from the viewpoint of their connecting method.

The transmitter 101 transmits IP multicasts to the network apparatus 102.

The network apparatus 102 receives IP multicast transmission start requests and IP multicast transmission stop requests with a MAC conversion request from the transfer apparatus 107. And the network apparatus 102 receives IP multicast transmission start requests and IP multicast transmission stop requests without any MAC conversion request from the transfer apparatus 109. And the network apparatus 102 converts the destination MAC addresses of the IP multicast received from the transmitter 101 into the MAC addresses in the destination receiver terminals (with individual control) 108 and transmits the IP multicasts whose destination MAC addresses have been converted into the transfer apparatus 107. And the network apparatus 102 transmits the IP multicasts received from the transmitter 101 to the transfer apparatus 109 without converting the destination MAC addresses of the IP multicasts.

The transfer apparatus 107 transmits the IP multicast transmission start requests and the IP multicast transmission stop requests with a MAC conversion request received from the receiver terminal (with individual control) 108 to the network apparatus 102. And the transfer apparatus 107 transmits the IP multicasts received from the network apparatus 102 to the receiver terminal (with individual control) 108.

The receiver terminal (with individual control) 108 transmits the IP multicast transmission start requests and the IP multicast transmission stop requests requiring the individual control of the IP multicast and coupled with a MAC conversion request to the transfer apparatus 107. And the receiver terminal (with individual control) 108 receives IP multicasts from the transfer apparatus 107.

The transfer apparatus 109 transmits the IP multicast transmission start requests and the IP multicast transmission stop requests without MAC conversion request and received from the receiver terminal (without any individual control) 110 to the network apparatus 102. And the transfer apparatus 109 transmits the IP multicasts received from the network apparatus 102 to the receiver terminal (without individual control) 110.

The receiver terminal (without individual control) 110 transmits the IP multicast transmission start requests and the IP multicast transmission stop requests not requiring the individual control of the IP multicasts and without any MAC conversion request to the transfer apparatus 109. And the receiver terminal (without individual control) 110 receives IP multicasts from the transfer apparatus 109.

Figure 16:
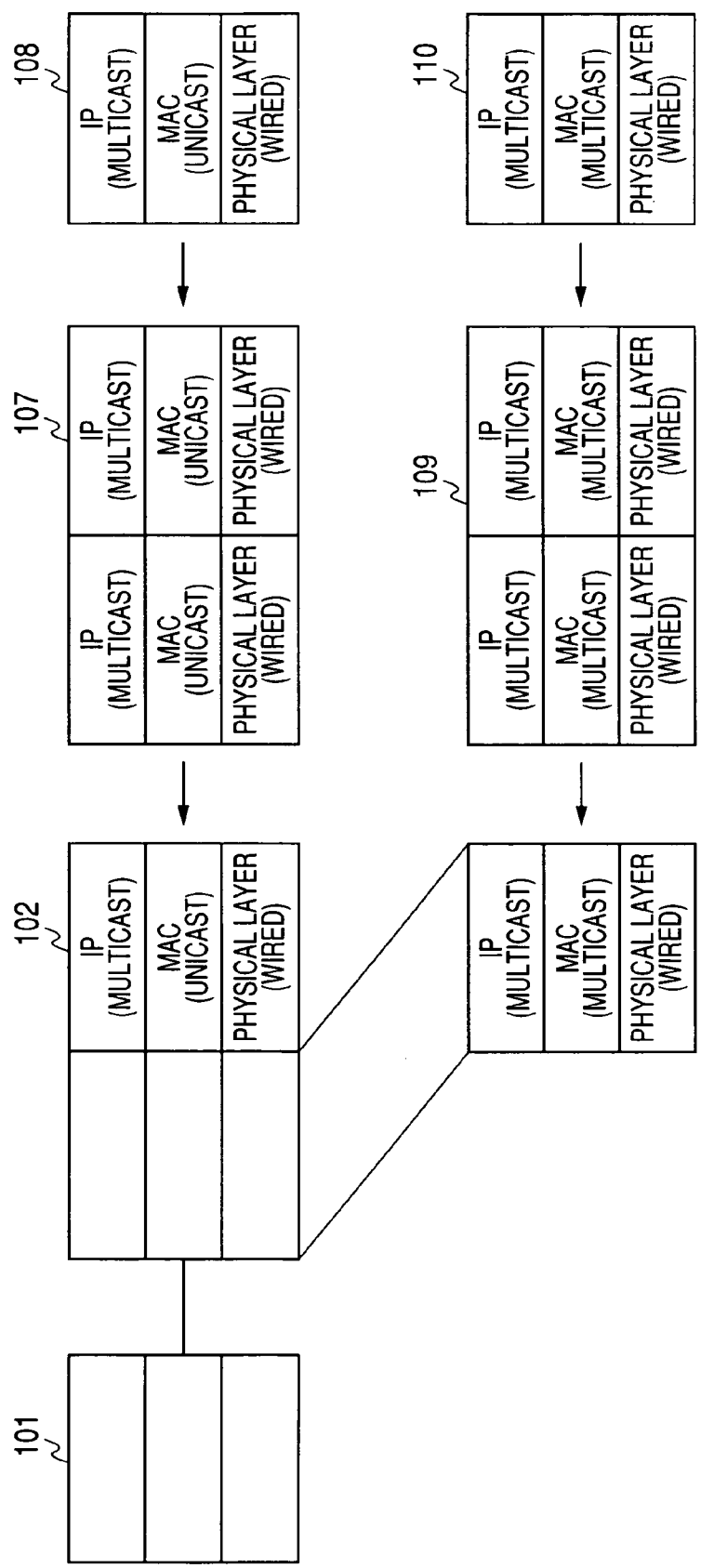
FIG. 16 shows the state of each layer of the IP multicast transmission start request and the IP multicast transmission stop request transmitted and received by various apparatuses shown in FIG. 15 according to the second embodiment of the present invention.

FIG. 16 shows the state of each layer of the IP multicast transmission start requests and the IP multicast transmission stop requests transmitted and received by each apparatus according to the second embodiment of the present invention.

The state of the physical layer includes the wired state. The state of the MAC layer includes the multicast and unicast state. And the state of the IP layer includes the multicast layer.

The receiver terminal (with individual control) 108 sets the unicast MAC addresses of the network apparatus 102 as the destination addresses of the MAC layer of the IP multicast transmission start requests and the IP multicast transmission stop requests and transmits them to the network apparatus 102.

The receiver terminal (without individual control) 110 sets the multicast MAC addresses as the destination addresses of the MAC layer of the IP multicast transmission start requests and the IP multicast transmission stop requests and transmits them to the network apparatus 102.

The network apparatus 102 determines whether the destination addresses of the MAC layer of the IP multicast transmission start requests and the IP multicast transmission stop requests are unicast addresses or multicast addresses. If the destination addresses of the MAC layer of the IP multicast transmission start requests and the IP multicast transmission stop requests are unicast addresses, it converts the MAC layer of the IP multicast received into unicast, and if they are multicast addresses, it relays leaving the MAC layer of the IP multicast received in the multicast state without converting the same.

Figure 17:
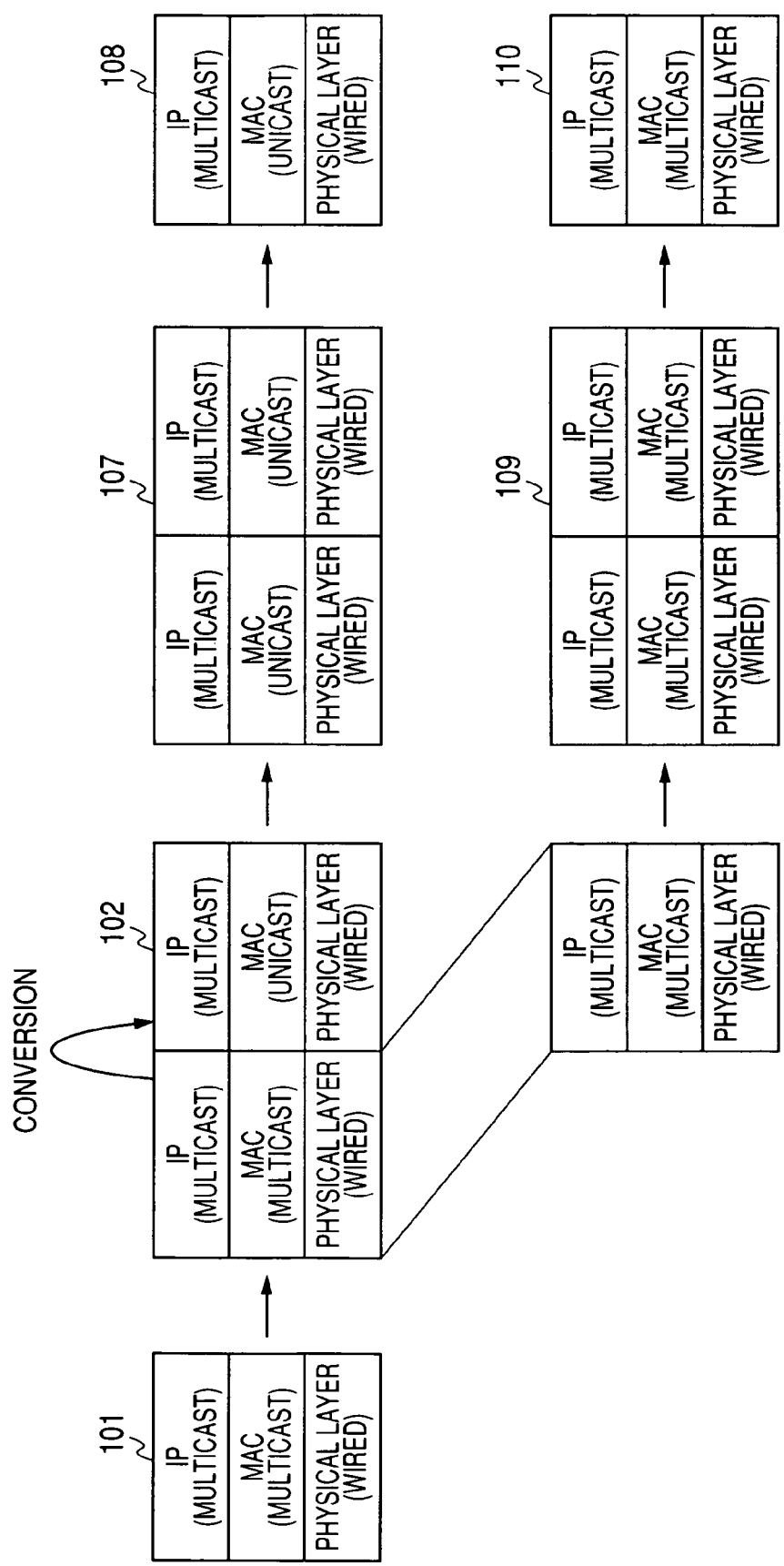
FIG. 17 shows the state of each layer of the IP multicast transmitted and received by various apparatuses shown in FIG. 15 according to the second embodiment of the present invention.

FIG. 17 shows the state in each layer of the IP multicast transmitted and received by each apparatus shown in FIG. 15 according to the second embodiment of the present invention.

The transmitter 101 transmits the IP multicasts from the physical layer (wired), the MAC layer (multicast) and the IP layer (multicast) to the network apparatus 102.

The network apparatus 102 converts the MAC layer of the IP multicast received from the transmitter 101 into the MAC addresses of the receiver terminal (with individual control) 108, and transmits the IP multicasts of the physical layer (wired), the MAC layer (unicast) and the IP layer (multicast) to the transfer apparatus 107. And the network apparatus 102 transmits the IP multicasts of the physical layer (wired), the MAC layer (multicast) and the IP layer (multicast) to the transfer apparatus 109 without converting the MAC layer of the IP multicast received from the transmitter 101.

The transfer apparatus 107 receives the IP multicast of the MAC layer (unicast) from the network apparatus 102, and transmits the IP multicast of the physical layer (wired), the MAC layer (unicast) and the IP layer (multicast) to the receiver terminal (with individual control) 108.

The receiver terminal (with individual control) 108 receives the IP multicast of the physical layer (wired), the MAC layer (unicast) and the IP layer (multicast) from the transfer apparatus 107.

The transfer apparatus 109 receives the IP multicast of the MAC layer (multicast) from the network apparatus 102 and transmits the IP multicast of the physical layer (wired), the MAC layer (multicast) and the IP layer (multicast) to the receiver terminal (without individual control) 110.

The receiver terminal (without individual control) 110 receives the IP multicast of the physical layer (wired), the MAC layer (multicast) and the IP layer (multicast) from the transfer apparatus 109.

Figure 18:
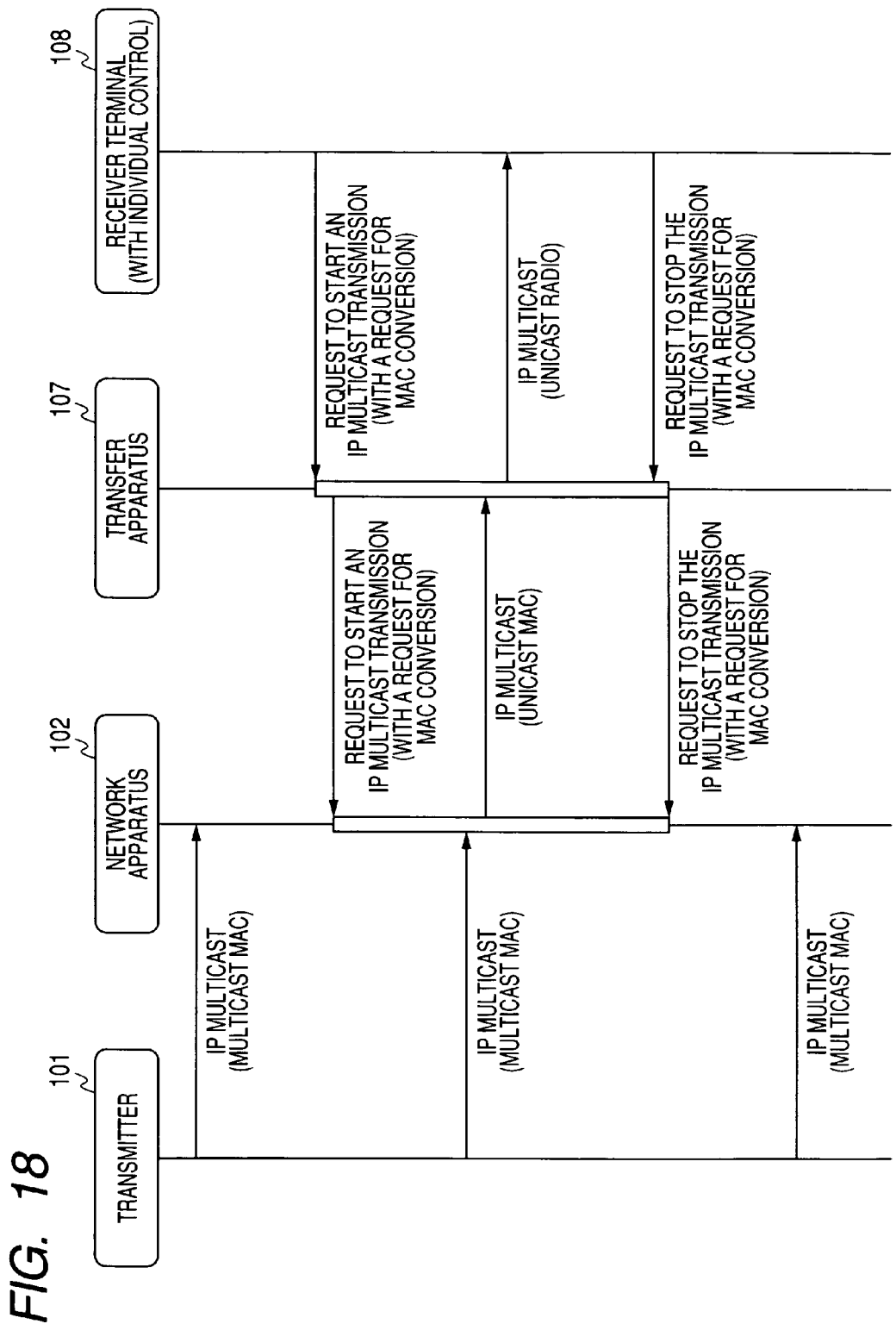
FIG. 18 is a sequence diagram for processing the IP multicast transmission start requests and the IP multicast transmission stop requests by the receiver terminals requiring the individual control of the IP multicast according to the second embodiment of the present invention.

FIG. 18 is a sequence diagram for processing the IP multicast transmission start request and the IP multicast transmission stop request from the receiver terminal requiring the individual control of IP multicasts according to the second embodiment of the present invention.

To begin with, the receiver terminal (with individual control) 108 transmits an IP multicast transmission start requests coupled with a request for MAC conversion to the transfer apparatus 107. Upon receipt of an IP multicast transmission start request coupled with a request for MAC conversion from the receiver terminal (with individual control) 108, the transfer apparatus 107 transmits an IP multicast transmission start request coupled with a request for MAC conversion to the network apparatus 102.

Then, upon receipt of an IP multicast transmission start request coupled with a request for MAC conversion from the transfer apparatus 107, the network apparatus 102 prepares IP multicast relay information including information on MAC conversion.

Then, based on the IP multicast relay information prepared, the network apparatus 102 converts the destination MAC addresses of the IP multicast received from the transmitter 101 into the unicast MAC addresses of the receiver terminals (with individual control) 108, and transmits the converted IP multicasts to the relay terminal 107. The transfer apparatus 107 transmits the IP multicasts received from the network apparatus 102 to the receiver terminal (with individual control) 108.

Then, the receiver terminal (with individual control) 108 transmits an IP multicast transmission stop request coupled with a request for MAC conversion to the transfer apparatus 107. Upon receipt of an IP multicast transmission stop request coupled with a request for MAC conversion from the receiver terminal (with individual control) 108, the transfer apparatus 107 transmits an IP multicast transmission stop request coupled with a request for MAC conversion to the network apparatus 102.

Then, upon receipt of an IP multicast transmission stop request coupled with a request for MAC conversion from the transfer apparatus 107, the network apparatus 102 deletes the IP multicast relay information prepared containing MAC conversion information.

Figure 19:
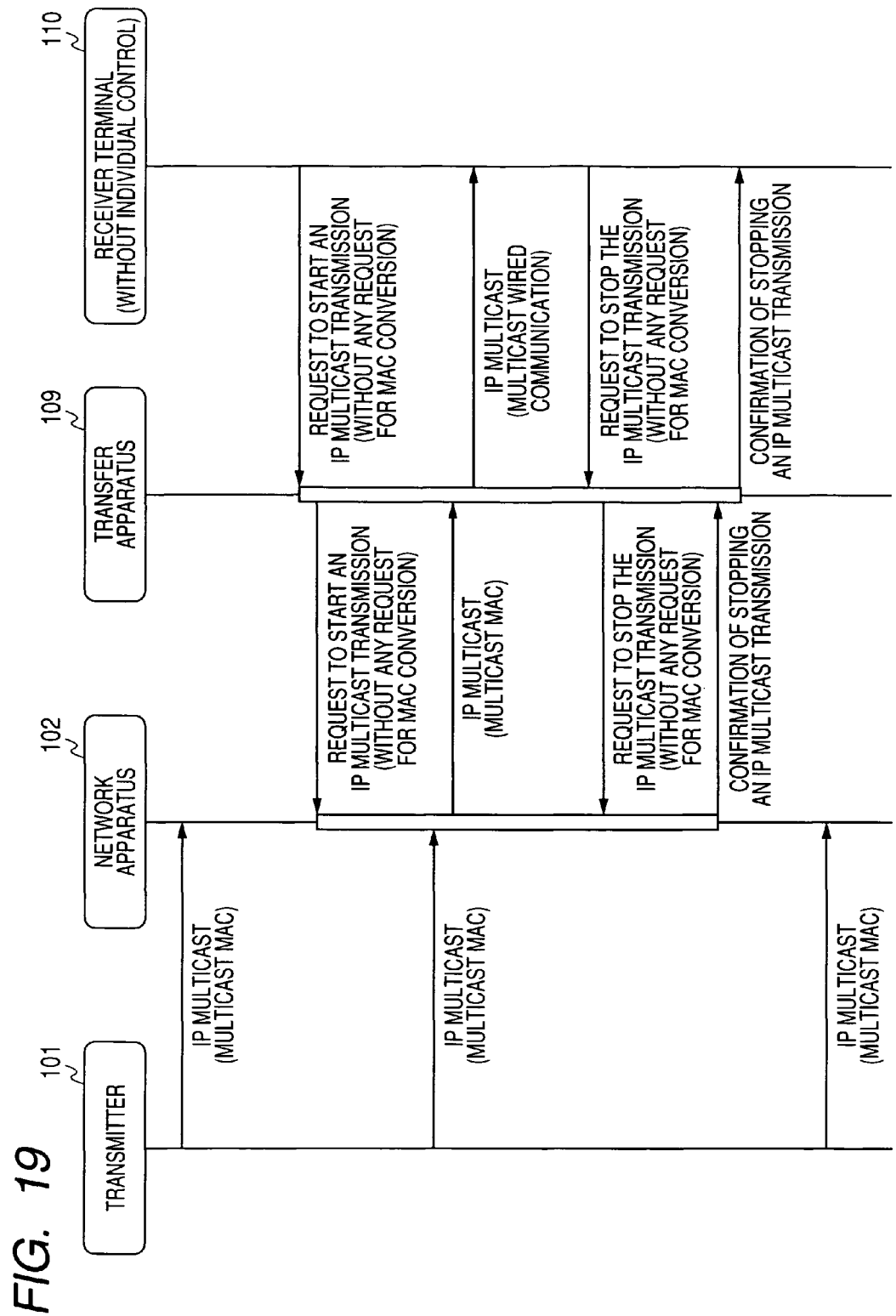
FIG. 19 is a sequence diagram for processing the IP multicast transmission start requests and the IP multicast transmission stop requests by the receiver terminals not requiring the individual control of the IP multicast according to the second embodiment of the present invention.

FIG. 19 is a sequence diagram for processing the IP multicast transmission start request and the IP multicast transmission stop request from the receiver terminal not requiring the individual control of IP multicasts according to the second embodiment of the present invention.

To begin with, the receiver terminal (without individual control) 110 transmits an IP multicast transmission stop requests without any request for MAC conversion to the transfer apparatus 109. Upon receipt of an IP multicast transmission start request without any request for MAC conversion from the receiver terminal (without individual control), the transfer apparatus 109 transmits an IP multicast transmission start request without any request for MAC conversion to the network apparatus 102.

Then, upon receipt of an IP multicast transmission start request without any request for MAC conversion from the transfer apparatus 109, the network apparatus 102 prepares IP multicast relay information without MAC conversion information.

Then, the network apparatus 102 transmits the IP multicasts received from the transmitter 101 based on the IP multicast relay information prepared to the transfer apparatus 109. The transfer apparatus 109 transmits the IP multicasts received from the network apparatus 102 to the receiver terminal (without individual control) 110.

Then, the receiver terminal (without individual control) 110 transmits IP multicast transmission stop requests without any MAC conversion request to the transfer apparatus 109. Upon receipt of an IP multicast transmission stop request without any MAC conversion request from the receiver terminal (without individual control) 110, the transfer apparatus 109 transmits an IP multicast transmission stop request without any MAC conversion request to the network apparatus 102.

Then, upon receipt of an IP multicast transmission stop request without any MAC conversion request from the transfer apparatus 109, the network apparatus 102 transmits a confirmation of stopping the IP multicast to the transfer apparatus 109. The transfer apparatus 109 transmits the confirmation of stopping the IP multicast it had received from the network apparatus 102 to the receiver terminal (without individual control) 110.

Then, in the absence of response to the confirmation of stopping IP multicast transmission during a predetermined period of time from the receiver terminal (without individual control) 110, the network apparatus 102 deletes the IP multicast relay information without any request for MAC conversion.

Third Embodiment

The third embodiment of the present invention is the case of a apparatus resulting from adding the function of a network apparatus of the first embodiment to the ONU of a PON (Passive Optical Network) system.

The difference from the first embodiment lies in that the network includes a PON apparatus (OLT: Optics Line Terminal) and a PON apparatus (ONU: Optical Network Unit) in the place of network apparatuses, wireless transfer apparatuses, and wired transfer apparatuses.

Figure 20:
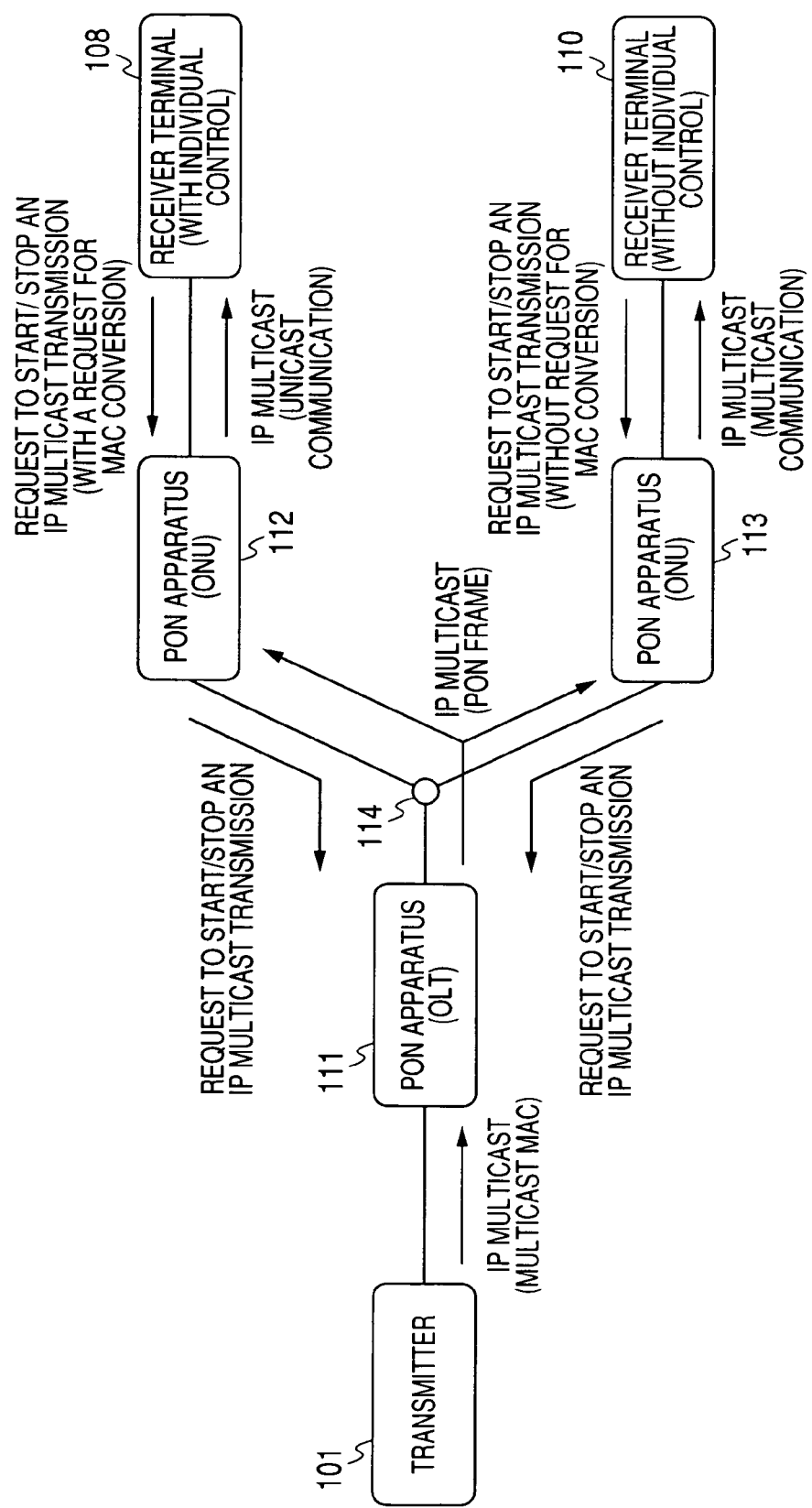
FIG. 20 is a block diagram of the network according to the third embodiment of the present invention.

FIG. 20 is a block diagram of the network according to the third embodiment of the present invention.

The network according to the third embodiment includes a transmitter 101, an OLT 111, an ONU 112, ONU 113, a optical splitter 114, a receiver terminal (with individual control) 108, and a receiver terminal (without individual control) 110. The expression "with or without individual control" means, like the second embodiment described above, for example, whether it is necessary or not to control the quality of IP multicast transmission for specific wired terminals.

The transmitter 101 transmits IP multicasts to the OLT 111.

The OLT 111 receives IP multicast transmission start requests and IP multicast transmission stop requests from the ONU 112. And the OLT 111 receives IP multicast transmission start requests and IP multicast transmission stop requests from the ONU 113. Furthermore, the OLT 111 transmits the IP multicast received from the transmitter 101 to the optical splitter 114. The optical splitter 114 distributes the IP multicasts received from OLT 111 into a plurality of ONU 112 and 113.

The ONU 112 transmits the IP multicast transmission start requests and the IP multicast transmission stop requests received from the receiver terminal (with individual control) 108 to the OLT 111. And the ONU 112 converts the destination MAC address of the IP multicasts received from the OLT 111 into the MAC addresses of the receiver terminal (with individual control) 108 and transmits the IP multicast whose destination MAC addresses have been converted to the receiver terminal (with individual control) 108.

The receiver terminal (with individual control) 108 transmits the IP multicast transmission start requests and the IP multicast transmission stop requests requiring the individual control of the IP multicast and coupled with a MAC conversion request to the ONU 112. And the receiver terminal (with individual control) 108 receives IP multicasts from the ONU 112.

The ONU 113 transmits the IP multicast transmission start requests and the IP multicast transmission stop requests received from the receiver terminal (with individual control) 110 to the OLT 111. And the ONU 113 transmits the IP multicast received from the OLT 111 to the receiver terminal (without individual control) 110 without converting the destination MAC addresses of the IP multicasts.

The receiver terminal (without individual control) 110 transmits the IP multicast transmission start requests and the IP multicast transmission stop requests not requiring the individual control of the IP multicast and without any MAC conversion request to the ONU 113. And the receiver terminal (without individual control) 110 receives IP multicasts from the ONU 113.

Figure 21:
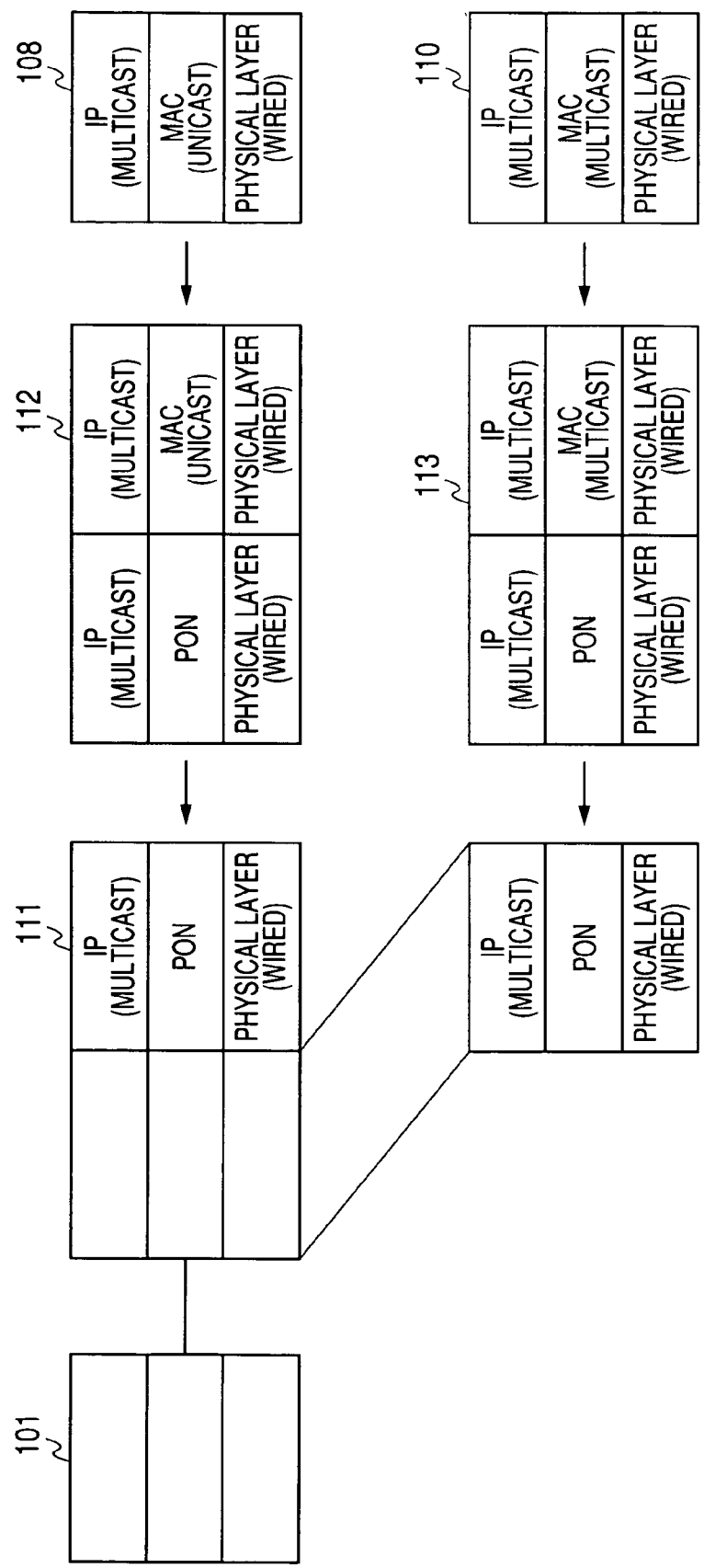
FIG. 21 shows the state of each layer of the IP multicast transmission start requests and the IP multicast transmission stop requests transmitted and received by various apparatuses shown in FIG. 20 according to the third embodiment of the present invention.

FIG. 21 shows the state of each layer of the IP multicast transmission start requests and the IP multicast transmission stop requests transmitted and received by various apparatuses according to the third embodiment of the present invention.

The receiver terminal (with individual control) 108 sets the unicast MAC addresses of the ONU 112 as the destination addresses of the MAC layer of the IP multicast transmission start requests and the IP multicast transmission stop requests to transmit the same to the ONU 112.

The receiver terminal (without individual control) 110 sets the multicast MAC addresses as the destination addresses in the MAC layer of the IP multicast transmission start requests and the IP multicast transmission stop requests to transmit the same to the ONU 113.

The ONU 112 and the ONU 113 determine whether the destination addresses in the MAC layer of the IP multicast transmission start requests and the IP multicast transmission stop requests are unicast addresses or multicast addresses. If the destination addresses in the MAC layer of the IP multicast transmission start requests and the IP multicast transmission stop requests are unicast addresses, the MAC layer of the IP multicast transmission received is converted to the unicast, and if they are multicast addresses, the MAC layer of the IP multicast transmission received is left as it is without conversion and the data are relayed as they are.

Figure 22:
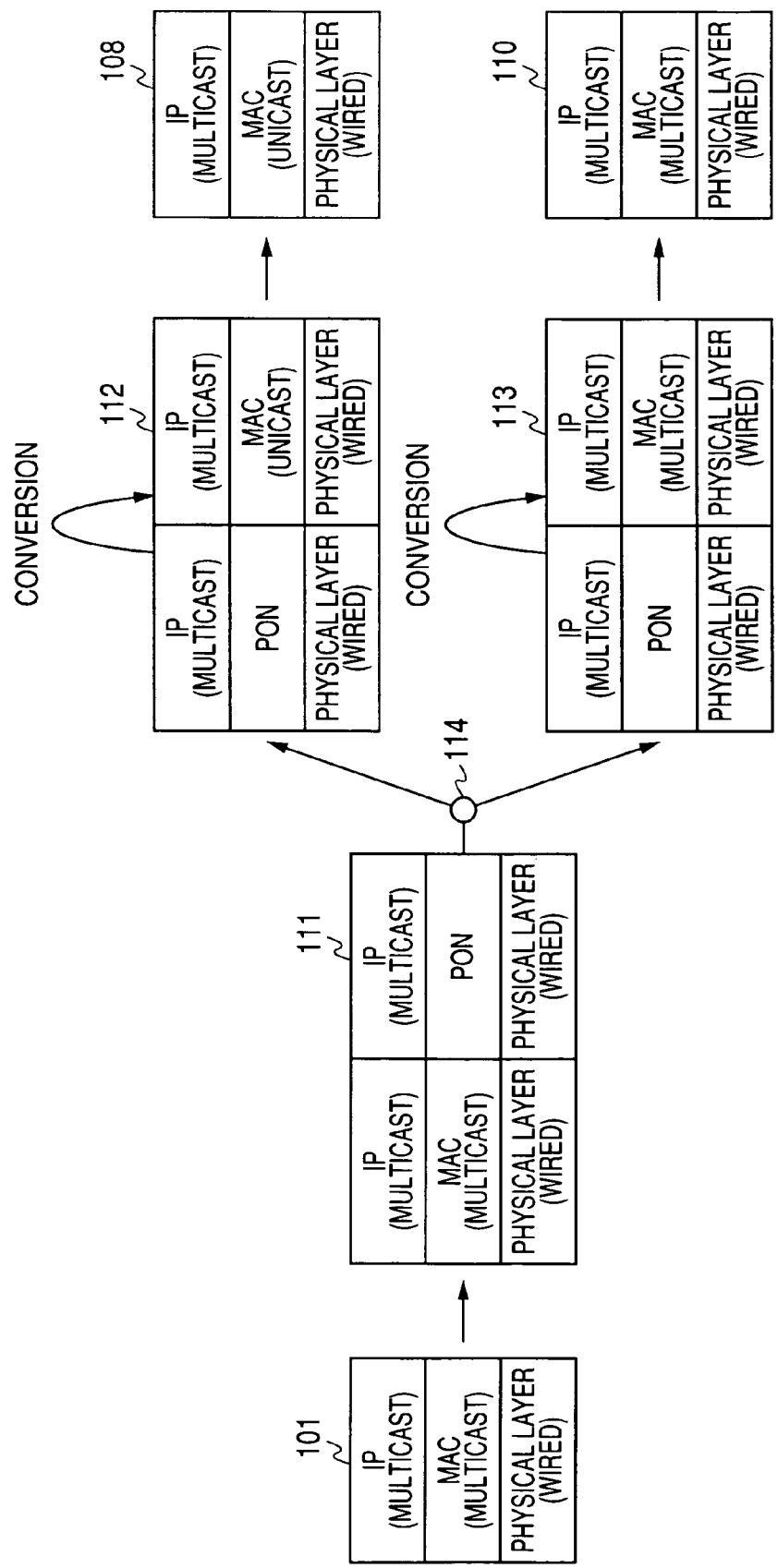
FIG. 22 shows the state in each layer of the IP multicasts transmitted and received by various apparatuses shown in FIG. 20 according to the third embodiment of the present invention.

FIG. 22 shows the state in each layer of the IP multicast transmission transmitted and received by various apparatuses shown in FIG. 20 according to the third embodiment of the present invention.

The transmitter 101 transmits the IP multicast in the physical layer (wired), the MAC layer (multicast) and the IP layer (multicast) to the OLT 111.

The OLT 111 constitutes the MAC layer part of the IP multicast received from the transmitter 101 in the PON frame format, distributes the IP multicast by a optical splitter 114 in the physical layer (wired), the PON layer and the IP layer (multicast) and transmits the same to the ONU 112 and the ONU 113.

The ONU 112 reconstitutes the PON layer of the IP multicast received from the OLT 111 by using the unicast MAC addresses of the receiver terminal (with individual control) 108, and transmits the IP multicasts in the physical layer (wired), the MAC layer (unicast) and the IP layer (multicast) to the receiver terminal (with individual control) 108.

The receiver terminal (with individual control) 108 receives the IP multicast in the physical layer (wired), the MAC layer (unicast) and the IP layer (multicast) from the ONU 112.

The ONU 113 reconstitutes the PON layer of the IP multicast received from the OLT 111 by using the multicast MAC addresses corresponding to the IP multicast addresses and transmits the IP multicast in the physical layer (wired), the MAC layer (multicast) and the IP layer (multicast) to the receiver terminal (without individual control) 110.

The receiver terminal (without individual control) 110 receives the IP multicast in the physical layer (wired), the MAC layer (multicast) and the IP layer (multicast) from the ONU 113.

Figure 23:
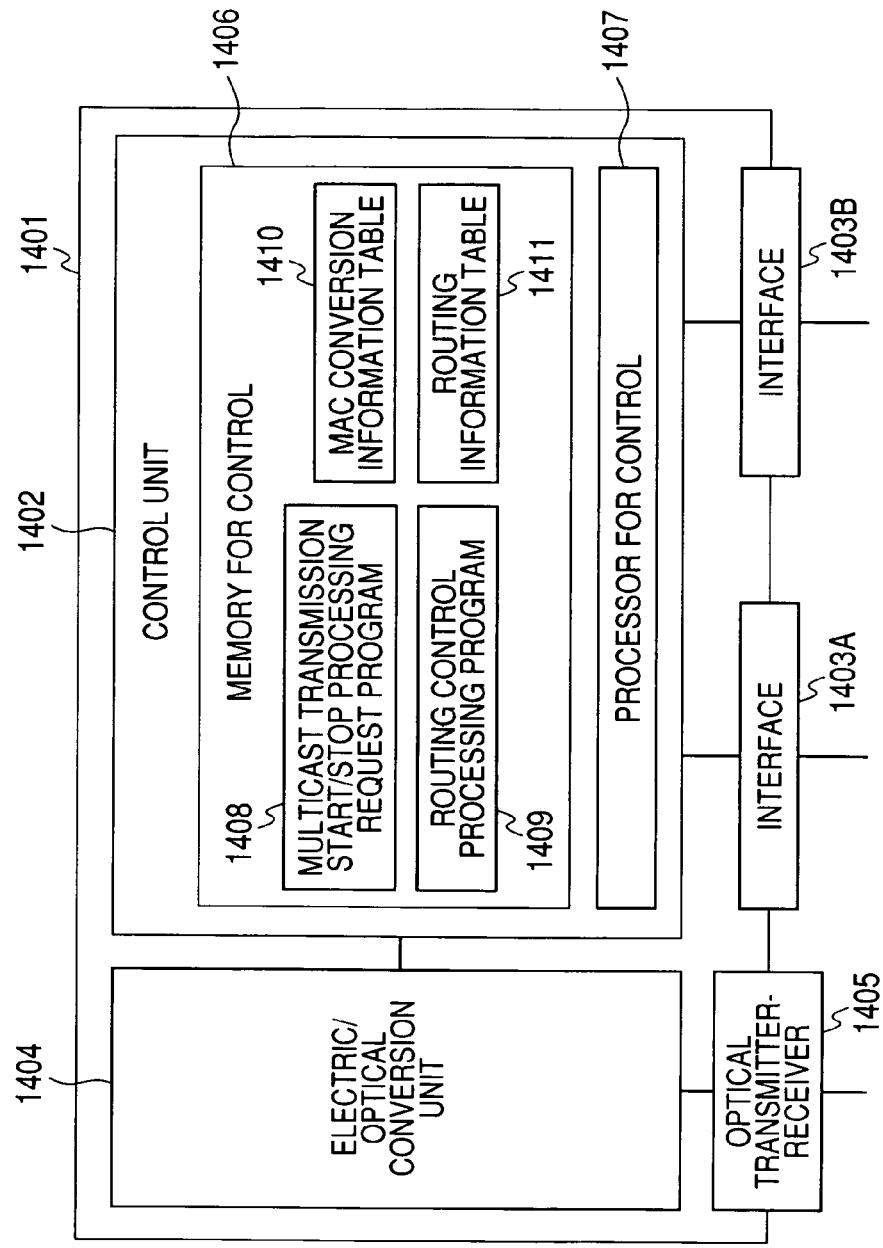
FIG. 23 is the block diagram of the ONU according to the third embodiment of the present invention.

FIG. 23 is a block diagram of the ONU according to the third embodiment of the present invention.

The ONU 1401 includes a control unit 1402, interfaces 1403 (1403A, 1403B), an electric-optical conversion unit 1404, and an optical transmitter-receiver 1405.

We omit the description of the control unit 1402 and the interface 1403, because they are made in the same way as the network apparatus according to the first embodiment. Incidentally, the control memory 1406 corresponds to the control memory 1104, the multicast transmission start/stop request processing program 1408 corresponds to the multicast transmission start/stop request processing program 1106, the routing control processing program 1409 corresponds to the routing control processing program 1107, the MAC conversion information table 1410 corresponds to the MAC conversion information table 1108, and the routing information table 1411 corresponds to the routing information table 1109. And the control processor 1407 corresponds to the control processor 1105, and the interface 1403 corresponds to the interface 1103.

The electric-optical conversion unit 1404 converts the data signal to be transmitted and received from electricity to light or from light to electricity.

The optical transmitter-receiver 1405 is an interface for transmitting and receiving data signals by light.

Figure 24:
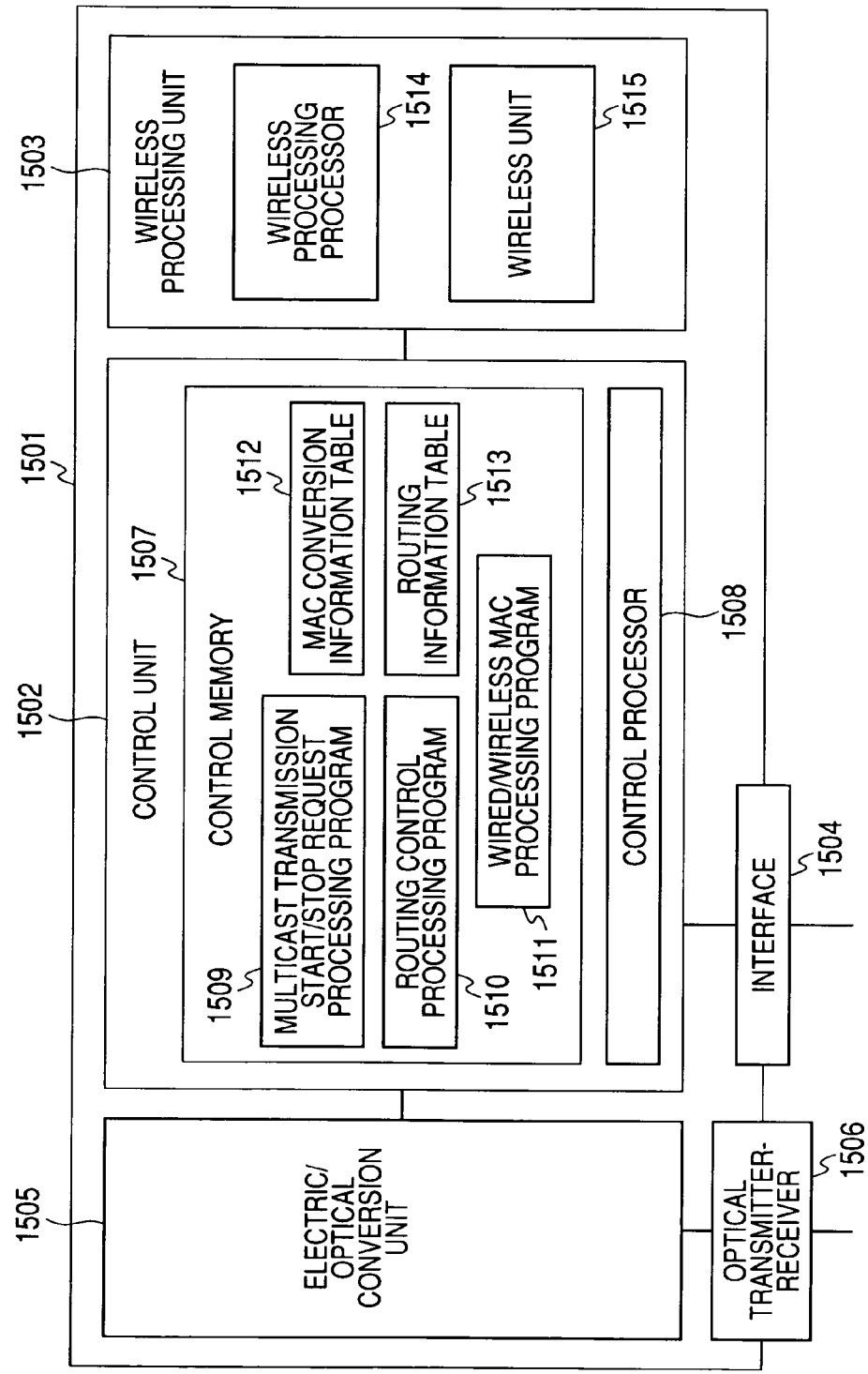
FIG. 24 is the block diagram of an ONU obtained by adding the function of a wireless transfer apparatus to the ONU according to the third embodiment of the present invention.

And as shown in FIG. 24, the function of a wireless transfer apparatus according to the first embodiment may be added to the ONU 1401 shown in FIG. 23.

FIG. 24 is a block diagram of an ONU wherein the function of a wireless transfer apparatus is added to the ONU according to the third embodiment of the present invention.

The ONU 1501 shown in FIG. 24 is a variation wherein the system of a wireless transfer apparatus 103 according to the first embodiment is added to the system of the ONU 1401 according to the third embodiment. Incidentally, it is possible to constitute a network by adopting the ONU 1501 in the place of the ONU 112 and ONU 113 shown in FIG. 20. In such a case, the ONU 1501 and the receiver terminal 108 are connected by a wireless circuit.

The ONU 1501 includes a control unit 1502, a wireless processing unit 1503, interfaces 1504, electric-optical conversion unit 1505, and optical transmitter-receiver 1506.

The control unit 1502 includes a control memory 1507 and a control processor 1508. The control memory 1507 includes a multicast transmission start/stop request processing program 1509, a routing control processing program 1510, a wired/wireless MAC processing program 1511, a MAC conversion information table 1512, and a routing information table 1513.

The wireless processing unit 1503 includes a wireless processing processor 1514 and a wireless unit 1515.

We omit the detailed description of various units because they are the same as described in FIG. 8 and FIG. 23. Incidentally, the multicast transmission start/stop request processing program 1509 corresponds to the multicast transmission start/stop request processing program 1408, the routing control processing program 1510 corresponds to the routing control processing program 1409, and the wired/wireless MAC processing program 1511 corresponds to the wired/wireless MAC processing program 1209. And the MAC conversion information table 1512 corresponds to the MAC conversion information table 1410, and the routing information table 1513 corresponds to the routing information table 1411. Furthermore, the control processor 1508 corresponds to the control processor 1407, and the interface 1504 corresponds to the interface 1403, the electric-optical conversion unit 1505 corresponds to the electric-optical conversion unit 1404, and the optical transmitter-receiver 1506 corresponds to the optical transmitter-receiver 1405.

Thus, it is possible to provide an ONU having a PON system with the function of a network apparatus and a wireless transfer apparatus.

Fourth Embodiment

The fourth embodiment of the present invention is the case of distinguishing whether the MAC layer should be converted from the multicast to the unicast or not in a way different from the first embodiment while the network apparatus is relaying an IP multicast transmission.

Figure 25:
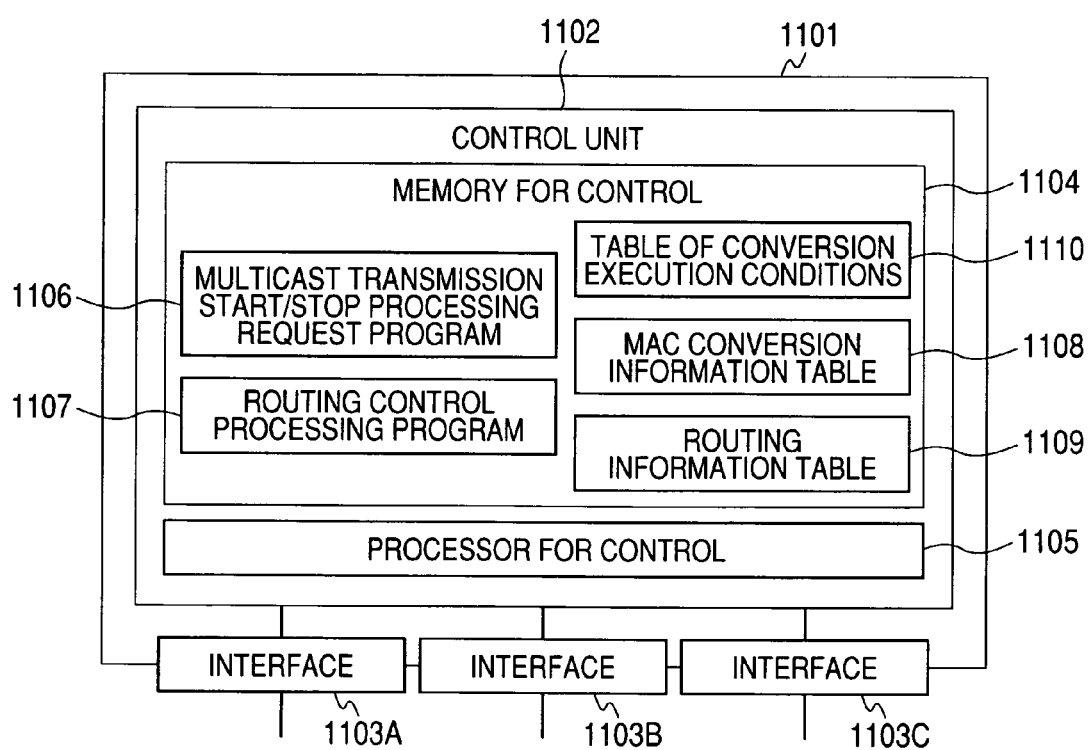
FIG. 25 is the block diagram of the network apparatus according to the fourth embodiment of the present invention.

FIG. 25 is a block diagram of the network apparatus according to the fourth embodiment of the present invention.

The difference from the first embodiment lies in that the control memory 1104 includes a conversion execution condition table 1110.

The conversion execution condition table 1110 contains the conditions required to determine whether the IP multicast transmission start request and the IP multicast transmission stop request that the network apparatus 102 had received require the conversion of unicast in the MAC layer or not.

FIG. 26 is a conversion execution condition table according to the fourth embodiment of the present invention.

The conversion execution condition table 1110 shown in FIG. 26 represents the case wherein the source IP addresses for the IP multicast transmission start request and the IP multicast transmission stop request are used as the condition for determining whether the conversion of unicast in the MAC layer is required or not.

The conversion execution condition table 1110 shown in FIG. 26 includes the source IP addresses 2401 for the multicast transmission start requests and the IP multicast transmission stop requests.

The conversion execution condition table 1110 is a register of unicast IP addresses. And when the source IP addresses for the IP multicast transmission start requests and the IP multicast transmission stop requests agree with the registered unicast IP addresses, at the time when the IP multicasts are to be relayed, the condition is set so that the MAC layer may be converted or not converted into the unicast.

Incidentally, the conversion execution condition table 1110 is referred when the IP multicast transmission start request or the IP multicast transmission stop request has been received. Specifically, when a determination is made whether a MAC conversion request is added to the IP multicast transmission start request or the IP multicast transmission stop request received in the step 3204 or the step 3208 shown in FIG. 13, the conversion execution condition table 1110 is referred. When a determination is made that the MAC layer is to be converted into the unicast, the process advances respectively to the step 3205 or the step 3209. On the other hand, when a determination is made that the MAC layer will not be converted into the unicast, the process advances respectively to the step 3206 or the step 3210.

FIG. 27 is another conversion execution condition table according to the fourth embodiment of the present invention.

The conversion execution condition table 1110 shown in FIG. 27 represents the case wherein the source MAC addresses for the IP multicast transmission start request or the IP multicast transmission stop request are used as the condition for determining whether the conversion of unicast in the MAC layer is necessary or not.

The conversion execution condition table 1110 shown in FIG. 27 includes the source IP addresses 2501 for the multicast transmission start requests and the IP multicast transmission stop requests.

The conversion execution condition table accepts the registration of unicast MAC addresses. And when the source IP addresses for the IP multicast transmission start requests and the IP multicast transmission stop requests agree with the registered unicast IP addresses, at the time of relaying the IP multicast, the condition is set in such a way that the MAC layer may be converted or not converted into the unicast.

Incidentally, like the conversion execution condition table 1110 shown in FIG. 26, when an IP multicast transmission start request or an IP multicast transmission stop request has been received, the conversion execution condition table 1110 shown in Table 27 is referred.

Fifth Embodiment

The fifth embodiment of the present invention represents the case wherein the source IP address information of the transmitter is added to the routing information table and the MAC conversion information table when the network apparatus controls the distribution of the IP multicast by using the IP multicast group addresses and the IP addresses of the transmitter.

FIG. 28 shows the routing information table according to the first embodiment of the present information.

The routing information table shown in FIG. 28 includes IP multicast group addresses 2101, source IP addresses 2104, input interface 2101, and output interface 2103.

The difference with the first embodiment lies in that the routing information table includes the source IP addresses.

The source IP addresses 2104 are the IP addresses of the transmitter for distributing IP multicasts.

FIG. 29 is the MAC conversion information table according to the first embodiment of the present invention.

The MAC conversion information table shown in FIG. 29 includes IPmulticast group addresses 2201, source IP addresses 2204, output interface 2202, and destination MAC addresses 2203.

The difference with the first embodiment lies in that the MAC conversion information table includes source IP addresses 2204.

For example, the column 2221 represents the information set when it is not necessary to convert the destination MAC addresses of IP multicast into unicast. In this case, the MAC address 01:00:5e:7f:01:01 corresponding to the IP multicast group address 239.255.1.1 is set as the destination MAC address 2203. And the column 2222-2225 is the information set when it is necessary to convert the destination MAC addresses of IP multicast into unicast. In this case, the MAC addresses of the receiver terminal that had requested the transmission of the IP multicast are set as the destination MAC addresses 2203.

FIG. 30 is a routing information table obtained by adding a MAC information table to the routing information table according to the fifth embodiment of the present invention.

The routing information table shown in FIG. 30 includes IP multicast group addresses 2301, source IP addresses 2305, input interface 2302, output interface 2303, and destination MAC addresses 2304.

We omit the detailed information on various constituent elements because they are the same as FIG. 28 and FIG. 29. Incidentally, the IP multicast group addresses 2301 correspond to the IP multicast group addresses 2101, the source IP addresses 2305 correspond to the source IP addresses 2104. And the input interface 2302 corresponds to the input interface 2102, and the output interface 2303 corresponds to the output interface 2103. And the destination MAC addresses 2304 correspond to the destination MAC addresses 2203.

What is claimed is:

1. A network system comprising:
    a transfer apparatus; and
    a network apparatus;
    wherein the transfer apparatus includes a transmitting and receiving unit that receives a plurality of transfer requests from a plurality of receivers, transmits a plurality of multicast packets to the plurality of receivers and transmits the plurality of transfer requests to the network apparatus;
    a MAC conversion processing unit that adds conversion information for requesting that a source unicast MAC address of each of the transfer requests is to be set as a destination MAC address of at least one of the plurality of multicast packets to the transfer requests, when the multicast packets are transmitted to the receivers requiring unicast communication, and
    wherein the network apparatus includes a network receiving unit that receives the plurality of transfer requests from the transfer apparatus and the plurality of multicast packets from a transmitter,
    a holding unit that holds destination unicast MAC addresses and destination multicast MAC addresses used for transferring the received multicast packets, wherein the destination unicast MAC addresses and the destination multicast MAC addresses are set based on a content of the transfer request,
    a reproduction unit that sets one of the unicast MAC addresses and multicast MAC addresses held in the holding unit to the source MAC address of each of the plurality of multicast packets, and
    a transmitting unit that transmits the plurality of multicast packets to the transfer apparatus,
    wherein the holding unit registers the source unicast MAC addresses of the received transfer request packet as the unicast destination MAC addresses of the multicast packets when the received transfer request packet has been added to the conversion information, and
    the holding unit registers multicast MAC addresses corresponding to destination IP addresses of the multicast packets as the destination multicast MAC addresses of the multicast packets when the received transfer request packet has not been added to the conversion information.

2. The network system of claim 1, wherein the holding unit holds a plurality of correspondence information of the destination MAC address and an IP multicast address, wherein the destination MAC address is one of the destination unicast MAC addresses and one of the destination multicast MAC addresses.

3. The network system of claim 2, wherein the reproduction unit converts header information in the destination multicast MAC address based on one of the correspondence information.

4. The network system of claim 2, wherein the reproduction unit reproduces one of the plurality of multicast packets once for each destination unicast MAC address and destination multicast MAC address corresponding to the IP multicast address.

5. The network system of claim 4, wherein the reproduction unit converts header information in the destination MAC address of at least one reproduced multicast packet based on information in the transfer request.

6. The network system of claim 1,
    wherein the reproduction unit judges whether the destination MAC address of multicast packets is converted into the unicast MAC addresses based on the holding information.

7. A network apparatus connected to a plurality of receivers via a transfer apparatus and a transmitter comprising:
    a network receiving unit that receives a plurality of transfer requests from the transfer apparatus and a plurality of multicast packets from the transmitter;
    a holding unit that holds destination unicast MAC addresses and destination multicast MAC addresses used for transferring the received multicast packets, wherein the destination unicast MAC addresses and the destination multicast MAC addresses are set based on a content of the transfer request,
    a reproduction unit that sets one of the unicast MAC addresses and multicast MAC addresses held in the holding unit to a source MAC address of each of the plurality of multicast packets; and
    a transmitting unit that transmits the plurality of multicast packets to the transfer apparatus;
    wherein the holding unit registers source unicast MAC addresses of the received transfer request packet as the destination unicast MAC addresses of the multicast packets when the received transfer request packet has been added to the conversion information, and
    the holding unit registers multicast MAC addresses corresponding to destination IP addresses of the multicast packets as the destination multicast MAC addresses of the multicast packets when the received transfer request packet has not been added to the conversion information.

8. The network apparatus of claim 7, wherein the reproduction unit converts a destination MAC address in header information of at least one of the plurality of multicast packets based on information in the transfer requests; and
    wherein the destination unicast address is a source unicast MAC address of the transfer request.

9. The network apparatus of claim 7, wherein the holding unit holds a plurality of correspondence information of the destination MAC address and an IP multicast address, wherein the destination MAC address is one of the destination unicast MAC addresses and one of the destination multicast MAC addresses.

10. The network apparatus of claim 9, wherein the reproduction unit reproduces one of the plurality of multicast packets once for each destination unicast MAC address and destination multicast MAC address corresponding to the IP multicast address.

11. The network apparatus of claim 10, wherein the reproduction unit converts a destination MAC address in header information of at least one of reproduced multicast packets based on information in the transfer requests.

* * * * *